(12) United States Patent
Jones

(10) Patent No.: US 8,910,453 B2
(45) Date of Patent: Dec. 16, 2014

(54) VACUUM INSULATED GLASS UNITS SYSTEM

(71) Applicant: Robert S. Jones, Delafield, WI (US)

(72) Inventor: Robert S. Jones, Delafield, WI (US)

(*) Notice: Subject to any disclaimer, the term of this patent is extended or adjusted under 35 U.S.C. 154(b) by 0 days.

(21) Appl. No.: 14/062,014

(22) Filed: Oct. 24, 2013

(65) Prior Publication Data

US 2014/0116516 A1 May 1, 2014

Related U.S. Application Data

(60) Provisional application No. 61/718,406, filed on Oct. 25, 2012, provisional application No. 61/725,110, filed on Nov. 12, 2012, provisional application No. 61/732,577, filed on Dec. 3, 2012, provisional application No. 61/751,891, filed on Jan. 13, 2013, provisional application No. 61/760,854, filed on Feb. 5, 2013, provisional application No. 61/767,379, filed on Feb. 21, 2013, provisional application No. 61/775,637, filed on Mar. 10, 2013, provisional application No. 61/802,527, filed on Mar. 16, 2013, provisional application No. 61/804,688, filed on Mar. 24, 2013, provisional application No. 61/863,639, filed on Aug. 8, 2013, provisional application No. 61/866,590, filed on Aug. 16, 2013.

(51) Int. Cl.
| | | |
|---|---|---|
| E06B 3/677 | (2006.01) | |
| F17D 5/00 | (2006.01) | |
| E06B 3/663 | (2006.01) | |
| E06B 3/66 | (2006.01) | |

(52) U.S. Cl.
CPC ............... *F17D 5/00* (2013.01); *E06B 3/66304* (2013.01); *E06B 3/6612* (2013.01); *E06B 3/677* (2013.01); *Y02B 80/24* (2013.01)
USPC .................................. 52/786.13; 52/204.593

(58) Field of Classification Search
CPC ............. E04B 1/803; E04C 2/54; E04C 2/34; E06B 3/6612; E06B 3/677; E06B 3/66304
USPC ........... 52/1, 171.2, 171.3, 204.591, 204.593, 52/204.595, 786.13, 2.16
See application file for complete search history.

(56) References Cited

U.S. PATENT DOCUMENTS 2,216,332 A * 10/1940 Wahl ............................ 52/171.3
2,374,531 A *  4/1945 Flory .......................... 251/129.1

(Continued)

FOREIGN PATENT DOCUMENTS

| JP | 2006083675 | 3/2006 |
| WO | WO 8802051 | 3/1988 |

OTHER PUBLICATIONS

Stephenson, Vacuum Insulated Office Buildings, dated Mar. 5, 2012, available at http://contest.techbriefs.com/2012/entries/sustainable-technologies/2142, printed on Jul. 8, 2013.

(Continued)

*Primary Examiner* — Mark Wendell
*Assistant Examiner* — Matthew J Smith
(74) *Attorney, Agent, or Firm* — Bell & Manning, LLC

(57) ABSTRACT

Vacuum systems comprising vacuum insulating glass (VIG) units are provided. The vacuum spaces within the VIG units are connected to one another and to one or more vacuum pumps that are configured to operate during the service lives of the VIG units.

24 Claims, 12 Drawing Sheets

(56) References Cited

U.S. PATENT DOCUMENTS

| | | | |
|---|---|---|---|
| 3,161,265 A | 12/1964 | Matsch et al. | |
| 3,858,372 A * | 1/1975 | Wilson | 52/2.16 |
| 3,990,201 A | 11/1976 | Falbel | |
| 3,991,531 A | 11/1976 | Becker | |
| 4,822,649 A * | 4/1989 | Canaud et al. | 52/786.13 |
| 6,541,084 B2 * | 4/2003 | Wang | 52/786.13 |
| 6,676,786 B1 * | 1/2004 | Collins et al. | 52/786.13 |
| 7,832,177 B2 * | 11/2010 | Stark | 52/786.13 |
| 8,182,887 B2 | 5/2012 | Jones | |
| 2003/0051436 A1 | 3/2003 | Veerasamy et al. | |
| 2012/0315409 A1 | 12/2012 | Jones | |
| 2013/0101759 A1 | 4/2013 | Jones | |

OTHER PUBLICATIONS

English language Machine translation of JP 2006083675, Mar. 30, 2006, Miyazaki.

International Search Report and Written Opinion issued in PCT/US2013/066617, Jan. 28, 2014.

* cited by examiner

SECTION "B"

DETAIL "A"
OF SECTION "C"

SECTION "E"

SECTION "D"

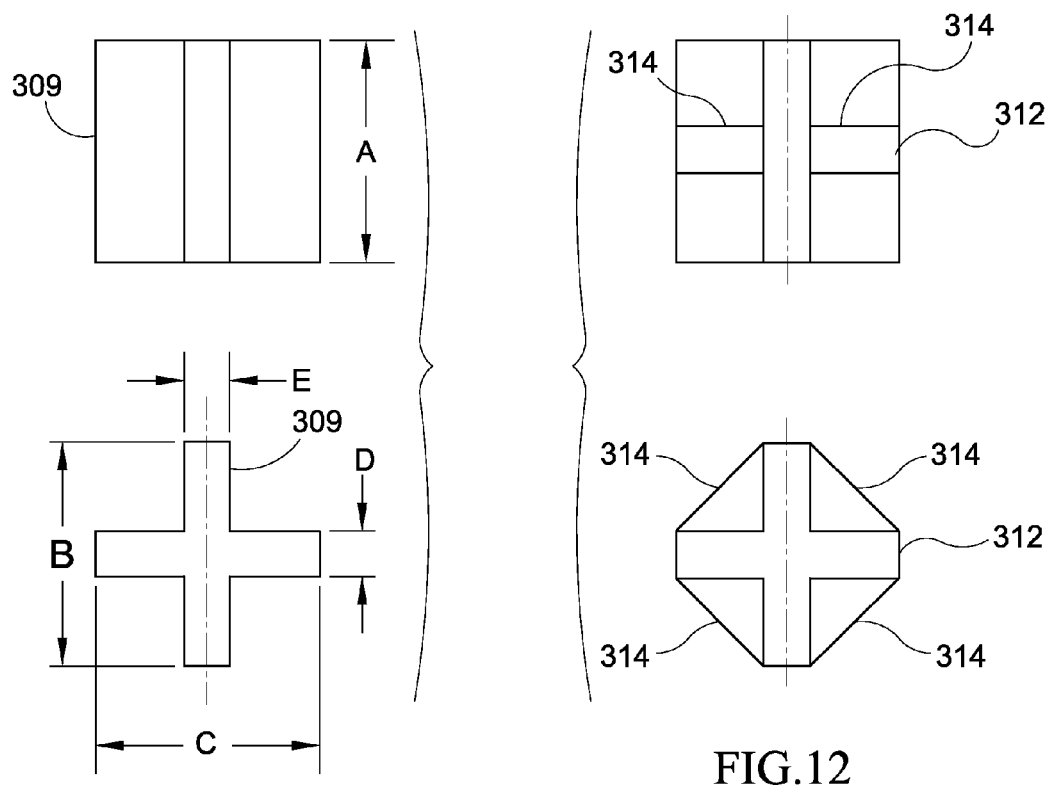
FIG. 11
FIG. 12
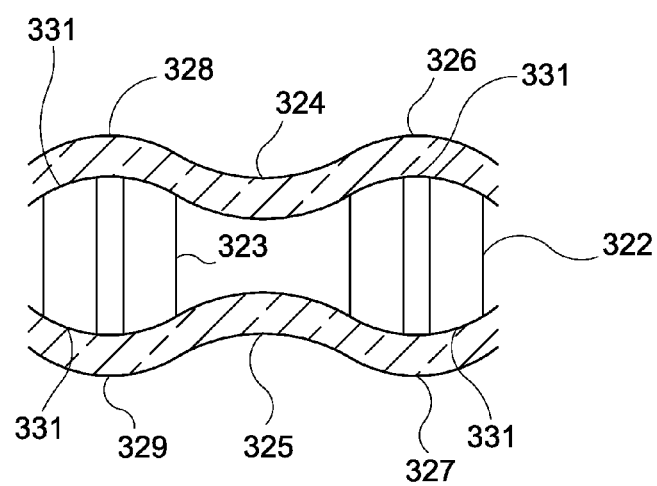
FIG. 13

SECTION "F"

VACUUM INSULATED GLASS UNITS SYSTEM

CROSS REFERENCE TO RELATED APPLICATIONS

The present application claims the benefit of priority of the following U.S. provisional applications: Ser. No. 61/718,406, filed on Oct. 25, 2012, and entitled "Vacuum Insulating Window with Multiple Stage Edge Seals;" Ser. No. 61/725,110, filed on Nov. 12, 2012, and entitled "Vacuum Insulating Window with Integral Vacuum Pump;" Ser. No. 61/732,577, filed on Dec. 3, 2012, and entitled "Vacuum Insulating Window Baked-Out after Installation and Method for Same;" Ser. No. 61/751,891, filed on Jan. 13, 2013, and entitled "Flapper Valve for Vacuum Insulating Window;" Ser. No. 61/760,854, filed on Feb. 5, 2013, and entitled "Hollow Cylindrical Spacer for Vacuum Insulating Window;" Ser. No. 61/767,379, filed on Feb. 21, 2013, and entitled "Cross Shaped Spacer for Vacuum Insulating Window;" Ser. No. 61/775,637, filed on Mar. 10, 2013, and entitled "Cross Shaped Polymer Spacer and Large Vacuum Gap for Vacuum Insulating Window;" Ser. No. 61/802,527, filed on Mar. 16, 2013, and entitled "Cross Shaped Polymer Spacer, Large Vacuum Gap, and Imbedded Edge Seal Spring for Vacuum Insulating Window;" Ser. No. 61/804,688, filed on Mar. 24, 2013, and entitled "Fluid Joint and Seal for Vacuum Tubing;" Ser. No. 61/863,639, filed on Aug. 8, 2013, and entitled "Polymer Spacer for Vacuum Insulated Glass Formed in Two Shot Injection Molding Operation;" Ser. No. 61/866,590, filed on Aug. 16, 2013, and entitled "Optically Clear Mat Polymer Spacer with Very Low Outgassing and Water Absorption for Vacuum Insulated Glass Unit;" the entire disclosures of which are incorporated herein by reference.

BACKGROUND OF THE INVENTION

A vacuum insulated glass (VIG) unit comprises two sheets of glass with at least one vacuum space in between them that is at a pressure less than atmospheric pressure. Separation of the glass sheets and maintenance of the vacuum space is accomplished by some sort of physical spacer system in between the glass sheets that resists the compressive load of atmospheric pressure and contributes to the prevention of collapse of the vacuum space. Around the periphery of the unit is at least one edge seal that seals the vacuum space from the atmosphere. The vacuum space reduces heat conduction and convection between the glass sheets. The spacer system, which conducts an amount of heat between the glass sheets that depends in part on the thermal conductivity of its materials, can tend to negate the high insulating value of the vacuum. A rigid or somewhat inflexible edge seal such as glass frit or metal may result in unacceptably high stress in a VIG unit if the temperature difference between the inner and outer glass sheets becomes too large as might occur in cold climates, so that the use of these materials for an edge seal can limit acceptable climates, the size of a unit, or both.

Current state of the art VIG units are evacuated once and permanently sealed at time of assembly. Those that utilize glass frit edge seals and discrete metal spacers maintain their service pressures only because the glass sheets, glass edge seals, and metal spacers can achieve extremely low outgassing rates in a high temperature bakeout at time of assembly.

SUMMARY OF THE INVENTION

Various embodiments of this invention relate to vacuum systems comprising, without limitation, VIG units whose vacuum spaces are connected to one another by conduit and to one or more vacuum pumps that operate during the service lives of the VIG units. A conduit herein is any enclosure capable of allowing gas flow. By way of example only, and without limiting the scope of this invention, a conduit may comprise tubing, ducts, pipes, valves, pumps, and interconnections and fittings such as tees, flanges, and manifolds. The vacuum pumps maintain most of the vacuum spaces at service pressures for a time period of indefinite duration or for an indefinite number of time periods of indefinite duration for the purpose of reducing heat conduction and convection through the residual gasses in the vacuum spaces.

By pumping a vacuum system comprising VIG units while the VIG units are in service, materials with relatively high outgassing rates, such as polymers, may be used in both edge seals and spacer systems instead of metals and glasses. Pumping would remove the outgassing products that continuously desorb from polymers so that vacuum service pressures may first be established and then maintained. Without removal, these outgassing products would cause the pressure in the vacuum space of a VIG unit to quickly exceed service pressures.

Edge seals comprising polymers would be less expensive than metal or glass and would cause significantly less stress than metal or glass seals. Polymer spacers with their very much lower thermal conductivity than metal spacers would greatly improve energy efficiency.

The lowest attainable pressure in a VIG vacuum space that is part of a pumped vacuum system comprising VIG units depends in part on the gas load (Torr·liter/second); molecular conductance (liter/second) of the vacuum system, which includes the effective molecular conductance of the VIG vacuum spaces; the pumping speed (liter/second) of the vacuum pump; and the integral leak rate of the vacuum pump (Torr·liter/second).

What follows is a discussion of gas load, outgassing, outgassing rates, molecular flow, molecular conductance, and the inverse power law nature of the reduction in outgassing rates, and how the conventional wisdom, based on these parameters, may explain why vacuum engineers have not, to the inventor's knowledge, previously developed a vacuum system comprising VIG units that are pumped while in service.

All vacuum systems, including VIG, are subject to a gas load or quantity of gas entering the vacuum per unit of time, frequently given as (Torr·liter/second), where Torr is a pressure unit equivalent to 1/760 of atmospheric pressure. At a given temperature, a gas load of one (Torr·liter/second) means that each second a quantity of gas that would occupy a volume of one liter at a pressure of one Torr at the given temperature enters the vacuum.

Gas load will cause a rise in vacuum pressure unless it is removed, which may be by pumping. Some of the gas load may be the result of leaks in the system or seal imperfections, but generally it is to a far greater extent a result of outgassing. Jousten (1999, p. 111) states (references cited: other publications):

Outgassing means usually two things (FIG. 1):
1. Molecules diffusing through the bulk of material of a vacuum chamber, entering the surface and desorbing from it [known as gas permeation where the higher the permeability of a material the higher the rate of gas permeation].
2. Molecules which have been absorbed previously, usually during venting of the vacuum chamber, that desorb again, when the chamber is pumped to vacuum.

Both effects have the same consequences: they limit the lowest achievable pressure in a vacuum chamber, they considerably extend the time for a high or ultrahigh vacuum to be reached, and the outgassing molecules are a source of impurities in a vacuum chamber . . . .

A further source of outgassing is the vaporization or sublimation of atoms or molecules from a material with a vapour pressure higher or comparable to the vacuum pressure to be applied to a chamber.

In the first type of outgassing Jousten (1999) describes above, which is known as gas permeation, gas molecules are first absorbed on outer surfaces of a vacuum chamber, they then diffuse through the bulk solid materials of the vacuum chamber and finally desorb from the inner surfaces of the vacuum chamber and enter the vacuum. Gas permeability is a measure of a material's ability to allow permeation, the higher the permeability of a material the higher will be the rate at which gas permeates through it.

Glasses and metals generally have very much lower gas permeabilities and outgassing rates than polymers.

Roth (1994, p. 6-7) states (references cited: other publications):

Gases have the possibility to flow through solids even if the openings present are not large enough to permit a regular flow [leak]. The passage of a gas into, through and out of a solid barrier having no holes large enough to permit more than a small fraction of the gas to pass through any one hole is known as permeation (American Vacuum Society[26]). The steady state rate of flow in these conditions is the permeability coefficient or simply the permeability. This is usually expressed in cubic centimeters of a gas at STP [standard temperature and pressure or 273.15° K (0° C., 32° F.) and 100 KPa (14.504 psi, 0.987 atm, 1 bar, 750.061 Torr)] flowing per second through a square centimeter of cross section, per millimeter of wall thickness and 1 torr of pressure drop across the barrier [$cm^3$(STP)mm/$cm^2$·sec·Torr].

Although he does not specifically state it, the second type of outgassing that Jousten (1999) describes also includes the release of gas and water molecules adhering in layers to the inner surfaces of a vacuum chamber with the greatest percentage of these molecules generally being water molecules. For the second type of outgassing described by Jousten (1999), the outgassing rate is given in terms of the quantity of gas evolving from a unit surface area per unit of time at a given temperature. Common units are (Torr·liter/$cm^2$·second).

For the vacuum space of a VIG unit to be insulating, that is to reduce heat conduction and convection through the residual gases in the vacuum space to an insignificant level, the mean free path of a gas molecule must be very much larger than the distance between obstructions, for example, and without limitation, the distance between the glass sheets of a VIG unit or the dimensions of the pore spaces of fumed silica or aerogel spacer mats. In physics, the mean free path is the average distance travelled by a moving particle (such as an atom, a molecule, or a photon) between successive impacts with other particles, which modify its direction or energy or other particle properties.

When the mean free path is very much larger than the smallest cross dimension of a vacuum system, the gas flow regime is molecular flow. Molecular flow is distinctly different from viscous flow. Everyone has experiential knowledge of viscous flow. However, very few people outside the fields of vacuum engineering and the physical sciences are aware of molecular flow and its probabilistic nature. Viscous flow is represented by fans, vacuum cleaners, and air escaping a balloon where gas molecules and atoms collide with each other and are moved by local pressure differences created by those collisions.

In molecular flow, gas molecules for the most part do not collide with each other but instead travel unimpeded directly between obstructions where they are absorbed on a surface and then may desorb in any given direction, including a direction opposite that of a vacuum pump, with nearly equal likelihood.

If a gas molecule enters the vacuum space of a VIG unit by permeating through a polymer edge seal or by desorbing from the surface of a polymer spacer it must be conducted, or make its way, to a vacuum pump by a sort of random walk of repeated absorptions and desorptions that is governed by probability and the size and 3D geometry of the vacuum system. Jousten (2008, p 81) states (references cited: other publications):

In the case of molecular flow, the individual gas particles travel back and forth between the walls of the tube with thermal velocity. A particle's direction after hitting the wall is (nearly) independent of its direction prior to the collision. Thus, a zigzag route develops (FIG. 4.2a). The geometry of the tube determines the resulting velocity of flow.

Concerning the three different types of flow regimes, including molecular flow, Jousten (2008, p 79-81) states (references cited: other publications):

Depending on the pressure and the cross dimensions of a tube, three types of flow can be differentiated:

1. For sufficiently low pressure, the mean free path of a gas particle is high, compared to the cross dimensions of the tube. Hardly any mutual particle collisions occur. Each gas particle travels through the tube due to its thermal motion, independent of other particles. However, frequent collisions with the tube walls cause a zigzag route. On average, the paths of many individual particles combine to form the macroscopic flow behavior. This situation is referred to as single-particle motion or molecular flow.

2. Under high pressure, the mean free path of gas particles is much lower than the cross dimensions of the tube. The particles experience frequent mutual collisions, thereby exchanging momentum and energy continuously. Even a small volume contains many frequent colliding particles. Thus, the gas behaves as a continuum. A flow is the result of local pressure gradients. This situation is referred to as continuum flow or viscous flow.

3. The medium-pressure range is characterized by a transition between molecular and viscous flow. In this transition, collisions of gas particles with the wall occur just about as often as mutual collisions amongst gas particles. This situation is referred to as transitional flow or Knudsen flow.

The ability of a system of enclosures to allow gas to flow in the molecular flow regime is known as molecular conductance. The higher the molecular conductance of a vacuum system in (liters/second) at a given temperature, the more probable it is that a gas molecule will reach the pump and the lower will be the attainable pressure. The longer, narrower, and more obstructed the passages leading to a pump, the lower the molecular conductance and the less likely it will be that a gas molecule will reach the vacuum pump, if ever.

To satisfy physical, practical, economic, and architectural constraints, a vacuum system comprising pumped VIG units must tend to be long with small cross sections, including the vacuum spaces between the glass sheets, and must therefore tend to have very low molecular conductance. This calls into question whether sufficiently low pressures can be established and maintained in the vacuum spaces of a system of connected VIG units with polymer edge seals or spacers with relatively high permeability and high outgassing rates.

Molecular conductance may impose a practical lower limit on the pressure in a vacuum system regardless of pumping speed. Jousten (2008, p 87-89) derives the relationships between pressure in the vacuum vessel, pressure at the pump, pumping speed, and conductance that establish the importance of low conductance for attaining low vacuum pressures (references cited: other publications). Jousten (2008, p 89) states (references cited: other publications):

> If the conductance is considerably below the pumping speed, the effective pumping speed is determined largely by the conductance and hardly by the pumping speed of the pump. Thus, any larger pump would not increase the effective pumping speed. Consequently, when installations are planned, tubes with maximum possible conductance should be selected (short tubes with large cross section).

The effective molecular conductance of a VIG vacuum space can be increased by increasing the distance between the glass sheets, or vacuum space gap, but in general, for any given VIG vacuum system with discrete spacers there will be a gap size beyond which any further increase quickly becomes unworkable. This is because the larger the gap size becomes, the lower the pressure must be for the mean free path to remain at least one order of magnitude larger than the gap size, which is necessary to make heat convection negligibly small.

Although increasing the gap size between two glass sheets of a VIG unit increases the effective molecular conductance of the vacuum space it also requires increasing the size of discrete spacers, which not only increases their outgassing area but also decreases molecular conductance by creating bigger obstructions between the glass sheets. This becomes particularly problematic for polymer spacers with their high outgassing rates and even more problematic for a polymer inclusive edge seal where the polymer contacts the vacuum. If discrete polymer spacers are used, going from a gap of 0.04 inch (1 mm) to 0.32 inch (8 mm) only makes it more difficult to achieve service pressures because the increase in the vacuum space effective molecular conductance due to the increase in gap size is more than offset by the increase in gas load from the increase in spacer surface area. Furthermore, the increased spacer size obstructs glass flow, which also tends to offset any gain in conductance from increased gap size. If in addition there is a 0.32 inch wide ribbon of elastomer edge seal ringing and in contact with the vacuum space this offset is compounded.

One can always increase the pumping speed of the pump (liter/second), but as discussed above, without sufficiently high molecular conductance of the vacuum system the lowest obtainable pressure is determined not by pumping speed but by the molecular conductance of the system, so that at some point increasing the pumping speed has no practical effect on the lowest attainable pressure at the furthest region from the pump, which in this case would be the furthest VIG vacuum space region.

Another consideration that would have naturally discouraged professionals practiced in the art of vacuum technology from pursuing a vacuum system comprising in-service pumped VIG units is the manner in which outgassing rates decrease once the pump starts. After pumping of a vacuum system has begun and after the flow regime becomes molecular, generally the net desorption rate or net outgassing rate will decrease according to an inverse power law such as $j_{des}=Kt^{-n}$, where $j_{des}$ is net desorption rate, K is a constant, t is time, and n is a constant.

Within a vacuum system, as the outgassing rates for the various gas species decrease so does the pressure. It therefore follows that pressure decrease also follows an inverse power law as molecules adhering to a vacuum chamber's surfaces and absorbed in its walls release, desorb, and are removed during pumping.

Because reduction in net outgassing rate and pressure follow inverse power laws, the rate at which pressure drops diminishes rapidly with time, so that if there were no ways to speed up this process, high vacuums (1E-3 to 1E-6 Torr) would be unachievable within any practical time frame for many applications. As time goes by the pressure in a continuously pumped vacuum vessel becomes asymptotic and reaches what is effectively a minimum value.

The process known as a "high temperature bakeout," which is described below, is one way to speed up the process of outgassing and to attain low pressures within practical time frames. Unfortunately, as will be discussed below, this is not an option for a vacuum system comprising VIG units with polymer edge seals or spacers.

Raising the temperature of a vacuum chamber increases outgassing rates and speeds up the removal of absorbed and adhering gas molecules. This occurs because the added energy overcomes binding energies, increases diffusion rates, imparts energy to liberated molecules, and increases molecular conductance. When the chamber cools and returns to ambient temperatures, outgassing rates may be very much lower than when the process began. If the temperature increase during this outgassing process is high, the procedure is called a high temperature bakeout.

Without a high temperature bakeout many high vacuum (1E-3 to 1E-6 Torr) systems would never achieve their low pressures in any reasonable amount of time. The same holds for current state of the art VIG. The permanently sealed commercially available VIG units with glass frit edge seals typically undergo a 200 to 350° C. (400 to 660° F.) high temperature bakeout at time of manufacture.

Raising the temperature of a current state of the art VIG unit to between 200 and 350° C. (400 to 660° F.) while evacuating with a vacuum pump attached directly to the unit with very little tubing distance between the vacuum space and pump can, within an hour, cause the glass sheets and metal spacers to outgas sufficiently such that when the unit returns to ambient temperatures the overall outgassing rate within the vacuum space is so low that the unit will maintain service pressures (1E-4 to 1E-3 Torr) for decades.

It is not practical or even possible to outgas a VIG unit with polymer edge seals or spacers in a high temperature bakeout operation at the time of its fabrication as is done with current state of the art VIG units. Even if it were possible to perform a high temperature bakeout of a VIG unit with polymer seals and spacers without damaging these materials, it is not practical because during the process of installation in a building and connection to a system of tubing the vacuum space of a VIG unit will be opened to the atmosphere (vented) causing re-absorption of gas and water molecules and layers of water molecules to redeposit on the internal surfaces of the glass sheets, spacers, and edge seal.

Furthermore, if there is a breach in a system of pumped VIG units causing the atmosphere to enter the system (venting), in order not to have to scrap those units, which may be prohibitively expensive, it must be possible to reestablish service pressures by pumping through the connecting tubing system at ambient temperatures.

For at least the reasons described above, a workable system of pumped VIG units with polymer edge seals or spacers must be able to achieve vacuum service pressures from an initially non-outgassed state while being pumped after installation at ambient or close to ambient temperatures.

To the inventor's knowledge, there is no published data indicating that the outgassing rate of a pumped ambient temperature vacuum system comprising VIG units with polymer edge seals or spacers could ever decrease to a point where required vacuum space service pressures could be achieved let alone maintained.

A vacuum system which is an embodiment of this invention may comprise, without limitation, valves, frit screens, temperature sensors, pressure sensors, air compressors, compressed air lines and pneumatically actuated devices, relays, solenoids, electrical cable, batteries, electric power generators, pumps, backup pumps, automated control systems, pump controllers, active and passive noise reduction systems, computers, computer cables, and computer programs. In part, and without limitation, a pump may contribute to maintaining the vacuum pressures of multiple VIG vacuum spaces by removing gases and gas species that permeate from the atmosphere into the vacuum spaces through the materials comprising the vacuum system including those comprising the VIG units. In part, and without limitation, a pump may contribute to maintaining the vacuum pressures of multiple VIG vacuum spaces by removing materials, gases, and gas species that evolve and outgas from the materials and surfaces comprising the vacuum system including those comprising the VIG units. In part, and without limitation, a pump may contribute to maintaining the vacuum pressures of multiple VIG vacuum spaces by removing materials, gases, and gas species that enter the vacuum system including the VIG units through leaks or less than perfect seals. In some embodiments, the vacuum systems comprise at least 10 VIG units. This includes embodiments in which the vacuum systems comprise at least 50 VIG units, at least 100 VIG units, or at least 250 VIG units.

It may be preferable for the pump(s) to run continuously, rather than to cycle on and off according to some time schedule or high and low pressure set points that maintain a VIG vacuum space pressure range in a manner similar to a furnace cycling on and off to maintain a comfortable temperature range. Thus, a pump may be considered to be configured to run continuously if that pump is configured to continue pumping until there is a system failure, an anticipated or increased likelihood of a system failure, an event that could precipitate a system failure, or an anticipated event that could precipitate a system failure.

A system failure may be any event that causes or could cause the atmosphere to enter the vacuum system at a rate faster than nominal outgassing and leak rates. By way of example only, and without limitation, a system failure may be a power failure, pump failure, valve failure, leak, physical damage that may result in the atmosphere entering the vacuum system, a need to service a pump or other vacuum system component, seal failure, relay failure, pressure sensor failure, computer failure, or battery failure. Events that may precipitate a system failure are, without limitation, a meteorological storm, a fire or suspected fire, human threat of damage, or a seismic event. For example, the pumps may run continuously for at least a month, at least 6 months, at least a year, at least 5 years, at least 10 years or at least 20 years, while the VIG units are in service.

Glass sheet herein may comprise, without limitation, laminated glass, such as, for example, glass sheets bonded together by a polymer. Glass sheet herein also comprises without limitation any glass object that is preponderantly flat with substantially even thickness but which may also have raised or contoured areas in regions that may function to maintain a space and separation between the otherwise flat and even thickness regions of two glass sheets. Though not detailed herein, this invention contemplates that glass sheets with raised contours or bumps may be used in some embodiments. Glass sheet herein also comprises any glass object that is preponderantly flat with substantially even thickness but which may also have recessed regions whose purpose may include containing a viscous material. A glass sheet herein may have coatings applied. A glass sheet herein may have active and or passive devices or components imbedded within it or attached to a surface and those devices or components may, without limitation, generate electricity when exposed to light. A glass sheet herein may comprise electrochromic or photochromic glass.

A vacuum insulated glass (VIG) unit herein means, without limitation, any insulating glass unit comprising at least two glass sheets with at least one vacuum space in between them at a pressure less than atmospheric pressure. In between the two glass sheets there may be multiple vacuum spaces and or additional glass sheets with some sort of a spacer system that resists collapse of the vacuum space under the compressive load of atmospheric pressure.

A spacer system herein means, without limitation, any physical element or number of elements that contribute to resisting the collapse of a vacuum space of a VIG unit under the total or partial compressive load of atmospheric pressure. By way of example only, and without limiting the scope of this invention, a spacer system may comprise discrete spacers of any size or shape arranged in any pattern in between glass sheets or a mat of a material such as fumed silica or aerogel in between glass sheets; metals, polymers, ceramics, or glasses; bumps or raised portions on glass sheets themselves and being formed of glass sheets or from glass sheets; spheres or rollers; and polymer mats with raised areas, which may be totally or partially optically clear.

Service pressure for a VIG vacuum space herein may mean without limitation any gas pressure that significantly reduces heat conduction and convection through a gas or a mixture of gases such as air within the vacuum space and may depend on the dimensions of the vacuum space, which may include without limitation the dimensions between the glass sheets of a VIG unit and/or the elements of a spacer system that may comprise materials such as fumed silica or aerogel or any other material within or defining a vacuum space.

The gas load for a VIG unit may have multiple sources that may include without limitation: atmospheric gas and water vapor permeation through the edge seal where gasses are absorbed on the surface of the seal, diffuse through the materials of the seal, and then desorb into the vacuum space; outgassing of gases that have been absorbed in the materials surrounding the vacuum space, or materials in communication with the vacuum space, including absorbed water and air molecules and water and gas molecules forming layers on surfaces; evolution of gas species and materials generated by the glass sheets and the materials of which the seal and spacers are made and by any materials in communication with the a vacuum space; and leaks. The largest source of outgassing may not be gas permeation through an edge seal comprising polymers but instead outgassing from the glass sheets and to an even greater extent outgassing from polymer spacers or edge seals. Gas permeation through glass is negligibly small and may not be a factor.

The term polymer as used herein is given its broadest meaning and therefore includes elastomers. An elastomer is a polymer with viscoelasticity (colloquially "elasticity"), generally having low Young's modulus and high failure strain compared with other materials.

By way of example only, and without limiting the scope of this invention, an edge seal comprising a polymer herein may include any of the edge seal technologies currently used for inert gas filled insulating glass units and may include composite, foam, and thermoplastic types of seals. By way of example only and not meant to be exhaustive in scope, or limit the scope of this invention, these seal types along with specific examples and manufactures are discussed in Van Den Bergh et al (2013, references cited: other publications) the entire disclosure of which is incorporated herein by reference. A polymer edge seal may comprise a viscous polymer.

Discrete spacers for a VIG unit herein includes any portion of a spacer system comprising individual spacers that, excluding any connections to a glass sheet, are unconnected and that are arranged in some pattern in between the glass sheets of a VIG unit.

BRIEF DESCRIPTION OF THE DRAWINGS

FIG. 11 shows a plan and profile detail of a cross shaped spacer for a VIG unit according to one embodiment of this invention.

FIG. 12 shows a plan and profile detail of a cross shaped spacer for a VIG unit according to one embodiment of this invention.

FIG. 13 shows a cross section of a portion of a VIG unit with cross shaped spacers according to one embodiment of this invention.

DETAILED DESCRIPTION OF EXAMPLE EMBODIMENTS OF THIS INVENTION

Figure 1:
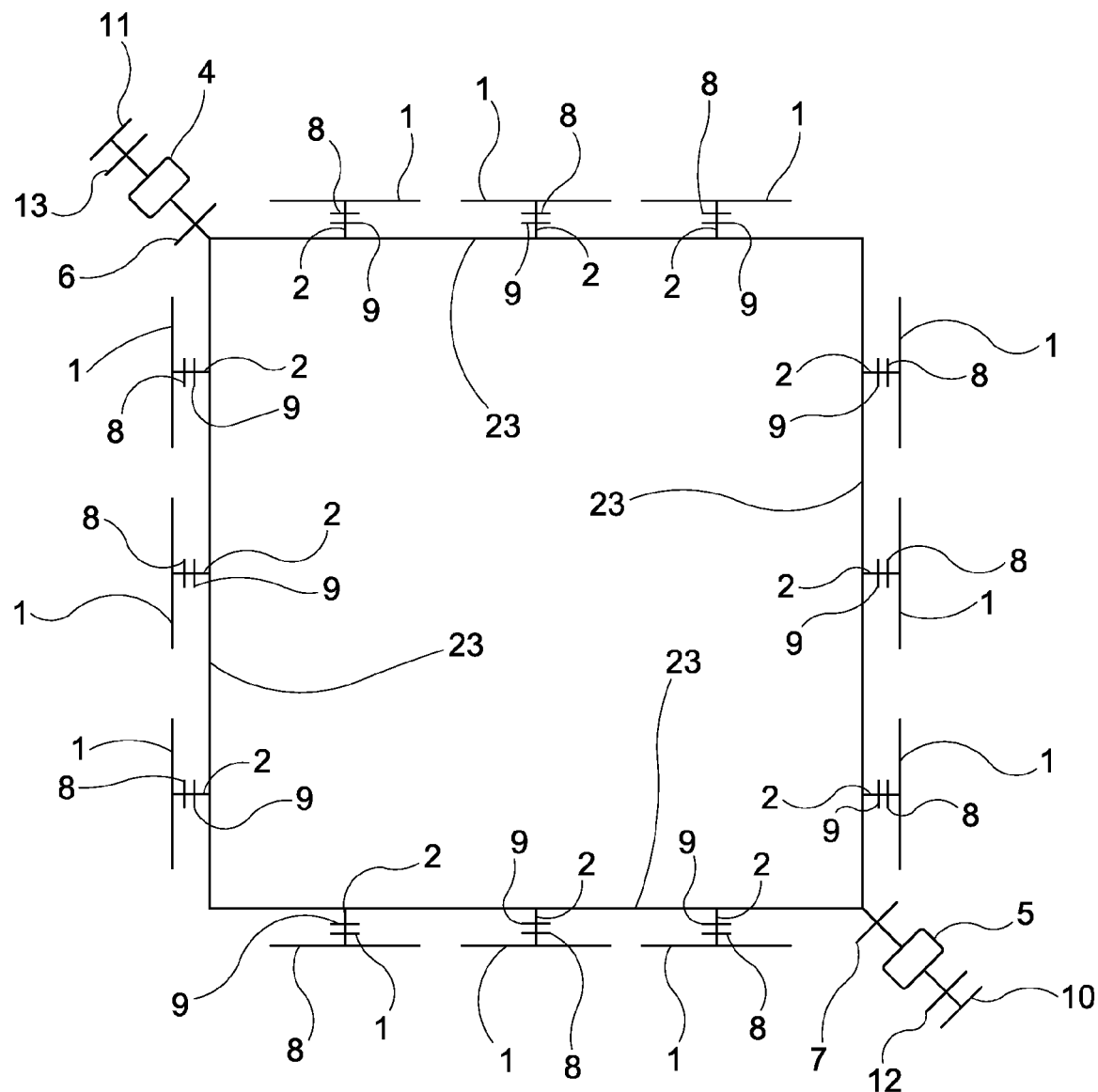
FIG. 1 shows a plan view schematic of a vacuum system comprising VIG units, vacuum valves, vacuum pumps, and a system of tubes and tubing stubs according to one embodiment of this invention.

FIG. 1 shows a plan view schematic of a vacuum system comprising VIG units, vacuum valves, vacuum pumps, and a system of tubes and tubing stubs according to one embodiment of this invention. This might represent the layout on any given floor of a building, such as a skyscraper. The vacuum spaces of VIG units 1 are connected by piping stubs 2 to piping system 3. Piping system 3 is connected to a vacuum pump 4 or multiple pumps such as 4 and 5. There may be one or more vacuum valves such as vacuum gate valves 6 and 7 that can be closed to isolate the vacuum system from the atmosphere. Closing valves 6 and 7 will maintain low pressures in the vacuum spaces of VIG units 1 for some period of time, allowing pumps 4 and 5 to be turned off for service or removed for replacement. Vacuum valves 6 and 7 may be closed as a safety measure if there is a likelihood of a power failure. There may be one or more vacuum valves such as 8 and 9 between the vacuum spaces of VIG units 1 and a tubing system 3. Any valves between the vacuum spaces of VIG units 1 and tubing system 3 may be connected to or form a part of stubs 2. By way of example only, and without limitation, valves 9 may be mini-gate valves. By way of example only, and without limitation, valves 9 may be closed if there is a likelihood of a power failure or of damage to any of the windows, if service needs to be performed on the system, there is a system failure, an anticipated or increased likelihood of a system failure, an event that could precipitate a system failure, or an anticipated event that could precipitate a system failure. Closing valves 9 would isolate all the VIG units from the system and prevent the atmosphere from flooding the system if any of the units 1 were damaged and breached. By way of example only, and without limitation, valves 9 may be remotely controlled. By way of example only, and without limitation, valves 9 may be actuated to close and or open manually, using compressed air, electrical energy (solenoid, motor), spring, or combination of these methods. There may be pressure sensors within the vacuum system that initiate a signal to close valves 9 if the pressure begins to rise faster than a set rate or exceeds a set value. There may be valves 10 and 11 that may be closed to isolate pumps 4 and 5 from the atmosphere. There may be multiple valves between the atmosphere and pumps 4 and 5 such as valves 10, 11, 12, and 13. Any valve within a vacuum system comprising VIG units may be closed while others remain open. Any number or combination of valves within a vacuum system comprising VIG units may be closed while others remain open. Any valve within a vacuum system of VIG units may be actuated to close or open manually, remotely, or automatically as desired or according to some system parameter such as vacuum pressure or temperature. A vacuum valve in a vacuum system comprising VIG units may be any commercially available vacuum valve or valve known in the art. Any valve within a vacuum system comprising VIG units may be connected to a computer and or the Internet using hard wiring or wireless connections or both. Any pump within a vacuum system comprising VIG units may be connected to a computer and or the Internet using hard wiring or wireless connections or both. Any sensor within a vacuum system comprising VIG units may be connected to a computer and or the Internet using hard wiring or wireless connections or both. Any vacuum system component such as and without limitation valves and pumps, any technologies, any processes, or any methods any of which are known in the art of vacuum engineering and vacuum systems may be employed in a vacuum system comprising VIG units.

Figure 2:
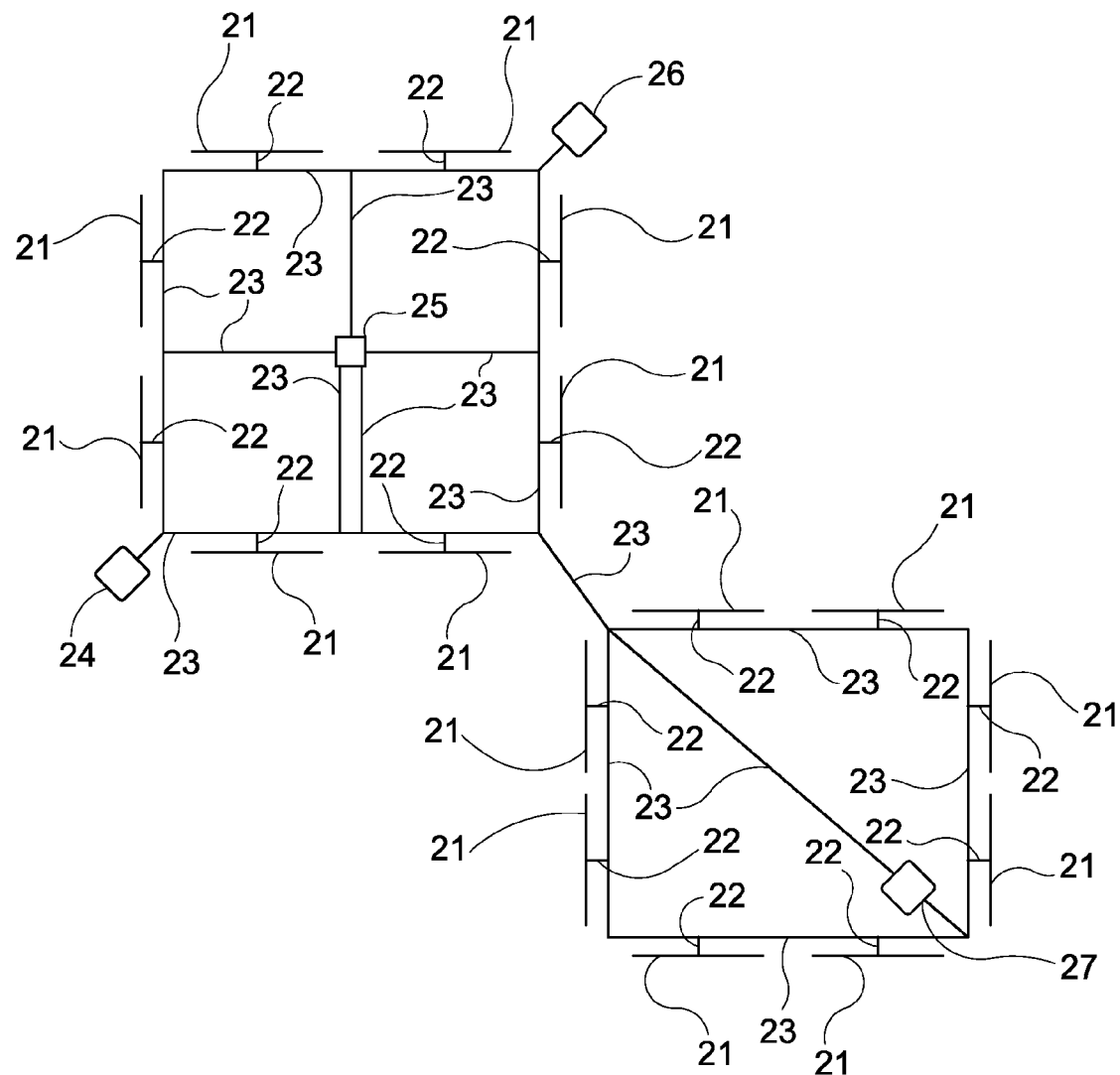
FIG. 2 shows a plan view schematic of a vacuum system comprising VIG units connected to vacuum pumps through a system of tubes with a different configuration than that shown in FIG. 1 to illustrate that a system of tubing may have a number of configurations and layouts according to this invention.

FIG. 2 shows a plan view schematic of a vacuum system comprising VIG units connected to vacuum pumps through a system of tubes with a different configuration than that shown in FIG. 1 to illustrate that a system of piping may have a number of configurations and layouts according to this invention. In FIG. 2 the vacuum spaces of VIG units 21 are connected by piping stubs 22 to piping system 23. Piping system 23 is connected to vacuum pumps 24, 25, 26 and 27.

A vacuum system of interconnected VIG units may comprise units on multiple floors or different levels of a building and the VIG units may be connected to one or more pumps by tubing that runs between floors or levels. A system of interconnected VIG units may be in different buildings or wings of the same building. Tubing that connects a VIG unit's vacuum space to a pump may tap the vacuum space at any location on the VIG unit.

The tubes or piping that connect a system of VIG units to a pump or pumps may be of any shape or size and may vary in size and shape and material and flexibility.

Figure 3:
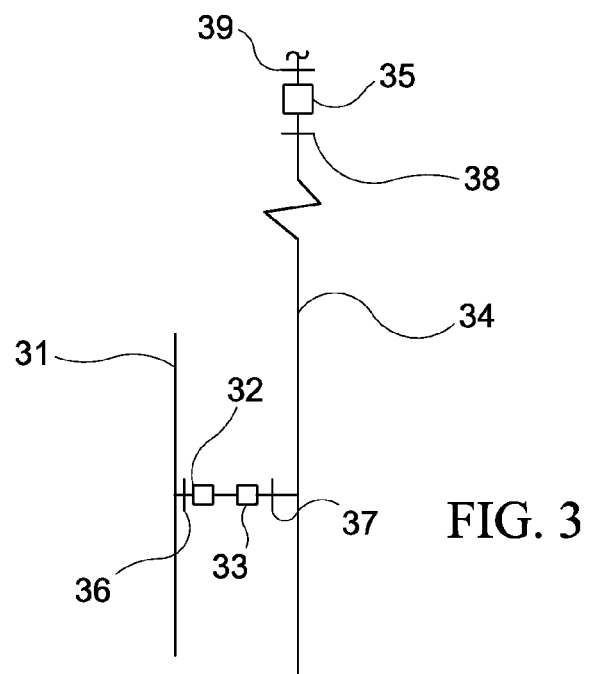
FIG. 3 shows a plan schematic detail of a VIG unit and its connection to a piping system that runs to a vacuum pump or pumps and other VIG units according to one embodiment of this invention.

FIG. 3 is a plan schematic detail of a VIG unit and its connection to a piping system that runs to a vacuum pump or pumps and other VIG units. A vacuum space of VIG unit 31 may be connected to a fast actuating vacuum valve 32 that may be connected to a slower actuating vacuum valve 33 that is connected to tubing 34 that connects to pump 35, other valves, and VIG units. Slower actuating valve 33 may be valve 9 in FIG. 1. Fast actuating valve 32 may be a two way valve that can close to limit air from entering tubing 34 or to limit air from entering VIG unit 31. For example, if VIG unit 31 fails, creating a breach to the atmosphere, air will rush into the system reaching sonic speed (speed of sound) and a shock wave will form. In order to limit the pressure rise in the VIG units connected to VIG unit 31 and to protect the pumps, valve 32 is desirably able to close within milliseconds of such a breach. A fast actuating valve such as valve 32 may be any valve as shown if FIG. 1, which includes valves 6, 7, 8, 9, 10, 11, 12, and 13. There is no limitation on where a fast actuating valve may be located in a vacuum system comprising VIG units. Also there is no limitation on where a slower actuating valve may be located in a vacuum system comprising VIG units. Still referring to FIG. 3, there may be screens 36, 37, 38, and 39 within the vacuum system that allow gas flow but block and stop debris that might enter the system or originate within the system and thus the screens may protect system components such as valves and pumps. Such screens may be located anywhere within a vacuum system comprising VIG units.

Figure 4:
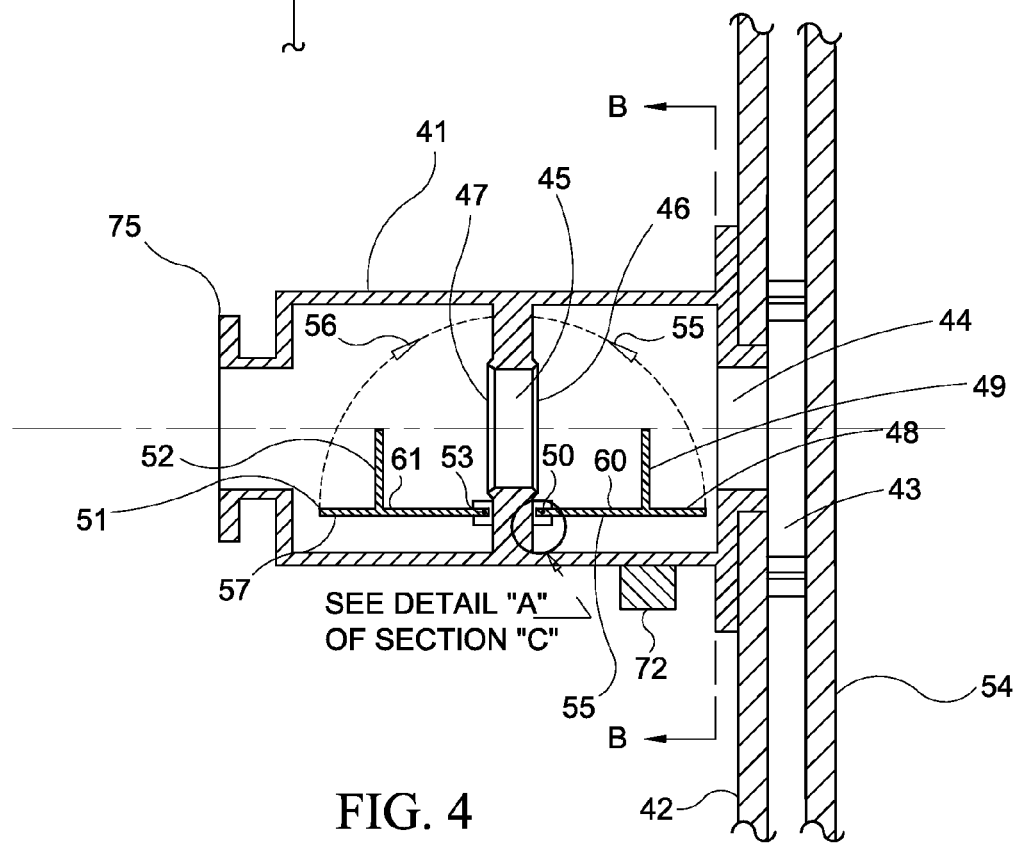
FIG. 4 shows a Section "A" of a highly reliable and simple vacuum valve that can serve as a self-actuating shockwave arrestor valve according to one embodiment of this invention.
Figure 5:
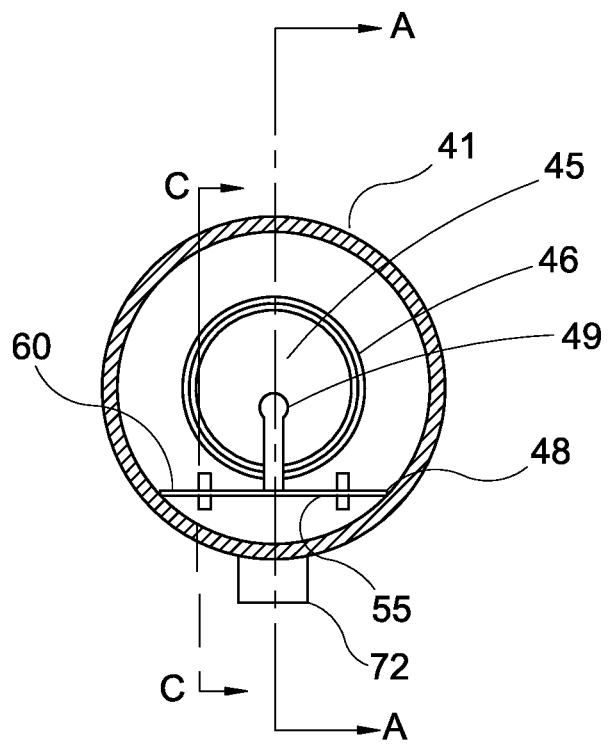
FIG. 5 shows a Section "B" of the valve shown in FIG. 4.
Figure 6:
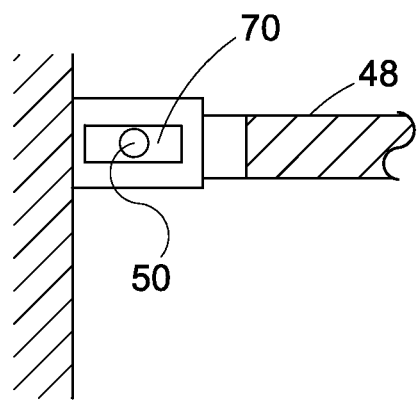
FIG. 6 shows a Detail "A" of Section "C" shown in FIG. 5.

FIGS. 4, 5, and 6 depict a highly reliable and simple vacuum valve 41 that can serve as the fast actuating vacuum valve 32 in FIG. 3 or as a fast actuating valve at any location in a vacuum system comprising VIG units. Valve 41 may be called a self-actuating shock wave arrestor valve. Valve 41 may be forced closed within a fraction of a millisecond by the arrival and action of an atmospheric wave front. Valve 41 may be attached to glass sheet 42 of a VIG unit and be in open communication with a vacuum space 43 through a port 44. Within valve 41 may be a port 45 with raised annular rings 46 and 47 on either side. Lightweight disk 48 with raised tab 49 pivots on low friction pin 50. Lightweight disk 51 with raised tab 52 pivots on low friction pin 53. If either or both glass sheets 42 and 54 break, allowing an atmospheric wave front to enter the vacuum system, disk 48 will pivot 55 about pin 50 and may be forced closed by air pressure acting on its backside 55 and on tab 49. Disk 48 may seat and seal against annular ring 46 and may be held in place by atmospheric pressure or partial atmospheric pressure.

Still referring to FIGS. 4, 5, and 6. If an atmospheric wave front does not originate in a breach of glass sheets 42 or 54, but instead elsewhere in the system, then disk 51 will pivot 56 about pin 53 and may be forced closed by air pressure acting on its backside 57 and on tab 52. Disk 51 will seat and seal against annular ring 47 and may be held in place by atmospheric pressure or partial atmospheric pressure and may thereby seal vacuum space 43 from the atmosphere.

Still referring to FIGS. 4, 5, and 6. The body of valve 41 may be a polymer and may be a low outgassing polymer. The polymer may have low gas permeability. The body of valve 41 may be baked and outgassed at an elevated temperature before having a coating of a metal applied to its exterior and or interior. The metal may be aluminum and may be vacuum deposited. The metal or other coating may be created by atomic layer deposition (ALD). A metal coating would reduce the permeability and outgassing rate of valve 41. The body of valve 41 may be metal such as stainless steel or aluminum. Disks 48 and 51 may comprise any suitable lightweight materials, which may include without limitation polymers, carbon fibers, ceramics, metals, or composites. There may be an elastomeric coating on face 60 of disk 48 that seats and seals against annular ring 46. There may be an elastomeric coating on face 61 of disk 51 that seats and seals against annular ring 47. Disks 48 and 51 may be baked, outgassed, and coated with a metal that may be vacuum deposited aluminum or a coating created by ALD.

Still referring FIGS. 4, 5, and 6. Annular rings 46 and 47 may be metal and inserted into valve 41 if valve 41 is of a different material such as a polymer. Annular rings 46 and 47 may be made of a stainless steel. Annular rings 46 and 47 may be annular knife edges that may be polished. Rings 46 and or 47 may have a coating of vacuum grease applied to them. Face 60 of disk 48 may have a coating of vacuum grease applied to it and face 61 of disk 51 may have a coating of vacuum grease applied to it.

Still referring to FIGS. 4, 5, and 6. FIG. 6 depicts a detail "A" of section "C". Pin 50 about which disk 48 pivots may be loosely set in a notched opening 70 so that disk 48 has freedom to align itself and seat flush against annular ring 46 shown in FIG. 4. Pin 53 of disk 51 may be situated in a notched opening similar to that of pin 50.

Referring to FIG. 4, a magnet 72 may keep disk 48 open until valve 41 and the VIG unit to which it is attached have been installed and the pump(s) started at which time magnet 72 may be removed. Flange or connection 75 may connect to another valve or to tubing, which then connects through other system components to a pump or pumps.

Figure 7:
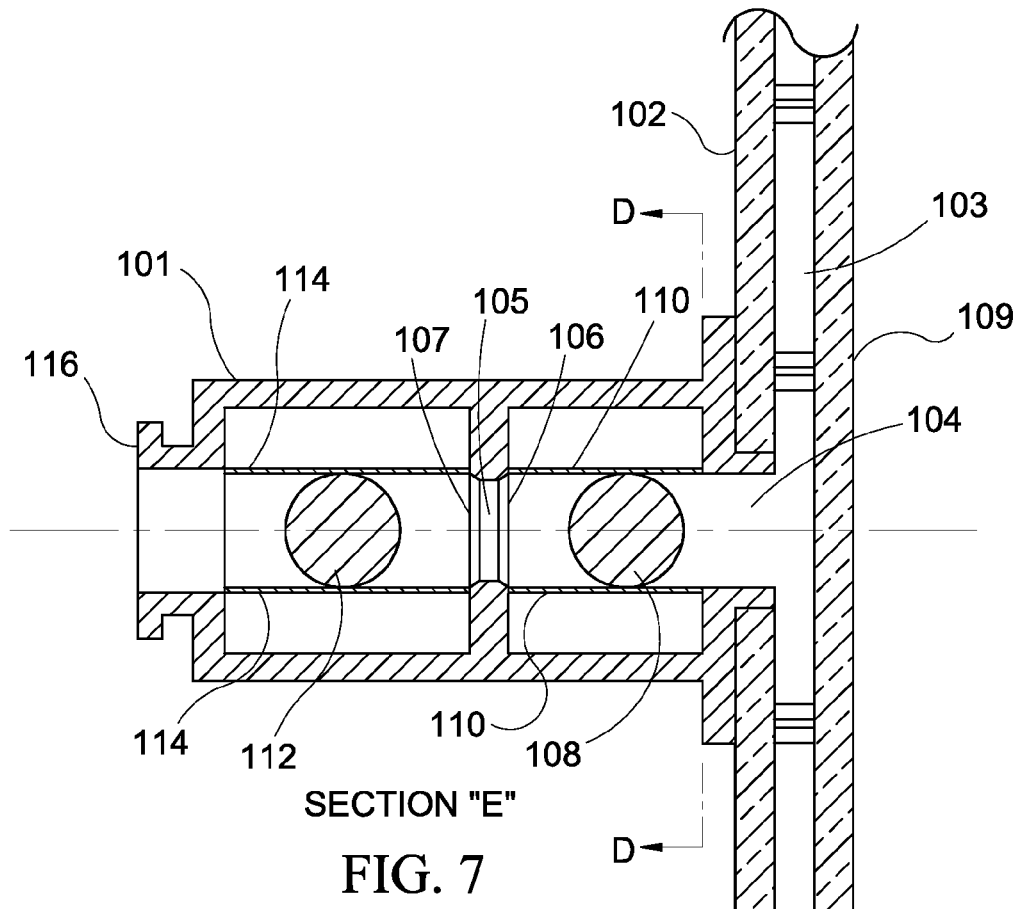
FIG. 7 shows a Section "E" of a highly reliable and simple vacuum valve that can serve as a self-actuating shockwave arrestor valve according to one embodiment of this invention.
Figure 8:
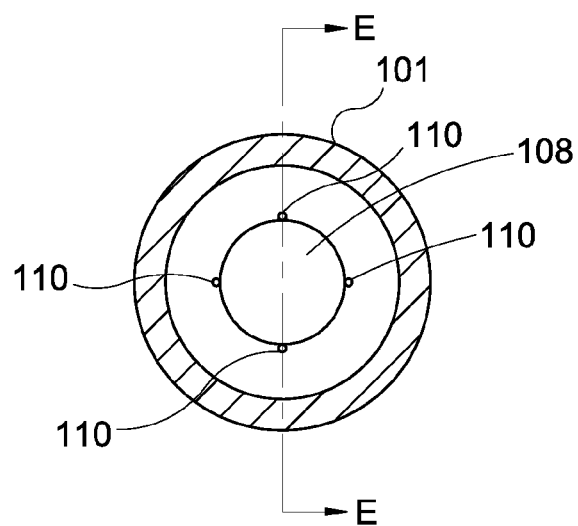
FIG. 8 shows a Section "D" of the valve shown in FIG. 7.

FIGS. 7 and 8 depict a highly reliable and simple vacuum valve 101 that can serve as the fast actuating vacuum valve 32 in FIG. 3, or self-actuating shock wave arrestor valve. Valve 101 may be forced closed within a fraction of a millisecond by the arrival and action of an atmospheric wave front. Valve 101 may be attached to glass sheet 102 of a VIG unit and be in open communication with a vacuum space 103 through a port 104. Within valve 101 may be a port 105 with annular seats 106 and 107 on either side. If either or both glass sheets 102 and 109 break, allowing an atmospheric wave front to enter the vacuum system, sphere 108 will be forced by air pressure into annular seat 106 thereby sealing the vacuum system from the atmosphere. Sphere 108 is constrained by a cage comprising members 110.

Still referring to FIGS. 7 and 8. If an atmospheric wave front does not originate in a breach of glass sheets 102 and or 109, but instead elsewhere in the vacuum system, then sphere 112 may be forced by air pressure into annular seat 107 thereby sealing the vacuum space 103 from the atmosphere. Sphere 112 may be constrained by a cage comprising members 114 in the same manner as sphere 108. Annular seats 106 and 107 may comprise a soft elastomeric material chosen for its low gas permeability and low outgassing. Annular seats 106 and or 107 may be coated with vacuum grease.

Referring to FIG. 7, flange or connection 116 may connect to another valve or to tubing, which then connects through other system components to a pump or pumps.

It is important that any system of tubing that connects a system of VIG units to a pump or pumps be able to withstand expansion and contraction and building movements. This becomes increasing critical as the building becomes taller because lateral sway excursions of the upper reaches of skyscrapers can exceed several feet. It may also be necessary for a system of tubing that connects VIG units to be able to withstand seismic events. Described herein is a fluid joint and seal for vacuum tubing that is suitable for connecting tubing sections of a vacuum system comprising VIG units. The fluid joint and seal compresses, expands, and rotates to accommodate lengthwise and rotational movement of the two tube ends that it joins while maintaining a seal against the atmosphere.

Figure 9:
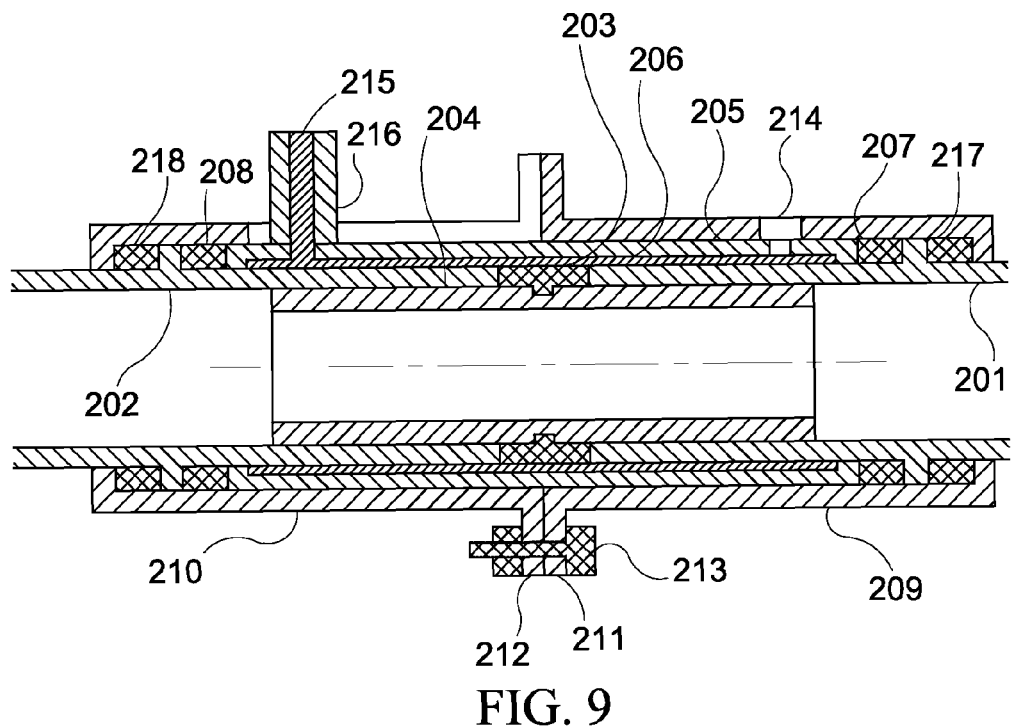
FIG. 9 shows a cross section of a fluid joint and seal for vacuum tubing according to one embodiment of this invention.

FIG. 9 shows a cross section of a fluid joint and seal for vacuum tubing according to one embodiment of this invention.

Referring to FIG. 9, tubes 201 and 202, which are to contain and maintain a vacuum at a pressure less than atmospheric pressure, are separated by a partially compressed elastomeric gasket 203. An inner sleeve 204 runs inside both tubes 201 and 202 and inside gasket 203. An outer sleeve 205 runs over tubes 201 and 202 and over gasket 203. A thin gap between sleeve 205 and tubes 201 and 202 and gasket 203 is filled with a low gas permeability fluid 206. Capping the ends of outer sleeve 205 are elastomeric gaskets 207 and 208. There may be two additional outer sleeves 209 and 210 that pass over outer sleeve 205. Outer sleeve 209 caps one end of sleeve 205 and partially compresses gaskets 207 and 217. Outer sleeve 210 caps the other end of sleeve 205 and partially compresses gaskets 208 and 218. Sleeve 209 may have a flange 211 and sleeve 210 may have a flange 212. Flanges 211 and 212 may be bolted 213 together. As tubes 201 and 202 move along their length, which may be the result of thermal expansion and contraction of tubes 201 and 202 or their supporting framework, elastomeric gaskets 203, 207, 208, 217, and 218 expand or contract and keep fluid 206 trapped between sleeve 205 and tubes 201 and 202. Fluid 206 presents a low gas permeability barrier between the moving elements of the joint, allowing them to move with respect to each other while providing a fluid seal that cannot be broken. Gaskets 203, 207, 208, 217, and 218 may have higher gas permeabilities than fluid 206.

Still referring to FIG. 9, after assembly, a vacuum pump may be attached at port 214, and while a port at 215 is closed, a vacuum may be established in the gap between sleeve 205 and tubes 201 and 202. After a vacuum has been established, port 214 may be sealed and fluid 206 pumped through port 215 into the gap between sleeve 205 and tubes 201 and 202. Port 215 may then be sealed with a flexible seal. When tubes 201 and 202 move, causing the compression or expansion of gaskets 203, 207, 208, 217 and 218, fluid 206 flows between tubes 201 and 202, gasket 203, and outer sleeve 205. Fluid 206 may move into and out of reservoir 216 that may be capped with a flexible seal at port 215 in order to accommodate thermal expansion and contraction of fluid 206 and as well as other joint elements.

Tubes 201 and 202 and sleeves 204 and 205 may be metal and have very low gas permeabilities and very low outgassing. For example, tubes 201 and 202 and sleeves 204 and 205 may be an aluminum alloy such as 6061-T6 or stainless steel. If the tubing is aluminum it may have a thin oxide layer to minimize outgassing.

Prior to pumping fluid 206 into the gap between tubes 201 and 202 and sleeve 205, tubes 201 and 202 and the gap between tubes 201 and 202 and sleeve 205 may be evacuated and the entire system may be baked out at an elevated temperature in order to outgas the system.

A vacuum system of which tubes 201 and 202 may be a part may be under continuous vacuum pumping or intermittent vacuum pumping.

Tubes 201 and 202 may be part of a vacuum system for VIG units in a building where multiple VIG units are connected through tubes such as 201 and 202 to a pumping station.

One end of gasket 203 may be adhered or cemented to tube 201 and the other end of gasket 203 may be adhered or cemented to tube 202.

One end of gasket 207 may be adhered or cemented to tube 201 and the other end of gasket 207 may be adhered or cemented to sleeve 205.

One end of gasket 208 may be adhered or cemented to tube 202 and the other end of gasket 208 may be adhered or cemented to sleeve 205.

Fluid 206 may be a low molecular weight polyisobutene (PIB) or a perfluoropolyether.

Gaskets 203, 207, 208, 217, and 218 may comprise for example, and without limiting the scope of this invention, silicone, Viton produced by DuPont, or Kalrez also produced by DuPont.

There may be a vacuum grease between inner sleeve 204 and tubes 201 and 202.

A cross shaped polymer spacer that allows a considerably larger vacuum gap than disclosed or practicable by prior art for VIG may be more suitable for VIG units with edge seals comprising polymers and vacuum spaces maintained by vacuum pumping while in service.

Figure 10:
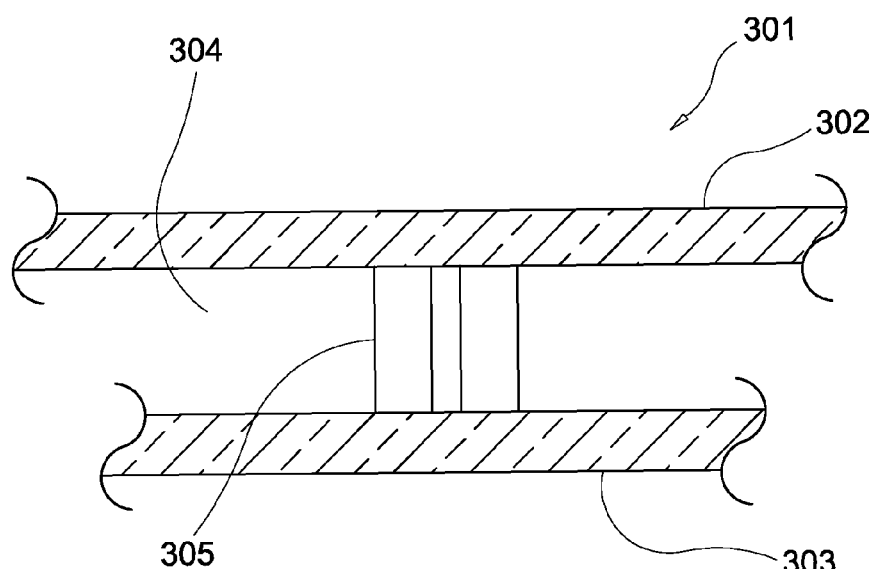
FIG. 10 shows a cross section of a portion of a VIG unit with cross shaped spacers according to one embodiment of this invention.

Referring to FIG. 10, a VIG unit 301 comprises glass sheets 302 and 303 separated by a vacuum gap 304 that is at a pressure less than atmospheric pressure. Cross shaped spacer 305 contributes to maintaining separation of glass sheets 302 and 303 by resisting the compressive load of atmospheric pressure.

Referring to FIG. 11, cross shaped spacer 309 may have a dimension A of 0.32 inch, a dimension B of 0.32 inch, a dimension C of 0.32 inch, and dimensions D and E of 0.047 inch. If spacer 309 is made of a polyimide such as DuPont Vespel TP-8005, which has a thermal conductivity of 0.13 W/(mK) (Watts/meter·degree Kelvin), and if the distance between adjacent spacers in between the glass sheets of a VIG unit is two inches, then that VIG unit can achieve an overall R-value of greater than R-28 (hr °F. ft$^2$)/Btu with a compressive pressure per cross shaped spacer of only 2000 (lbs/in$^2$). This is well below the 21,000 (lbs/in$^2$) pressure at 10% strain for TP-8005. The cross shape of the spacer allows dimension A to be increased well above the typical 0.02 inch thickness of disk shaped spacers known in the art while minimizing the cross sectional area of the spacer in a plane parallel to the glass sheets while at the same time maintaining dimensions B and C equal to dimension A for stability. This is because the cross shape resists localized buckling. Increasing dimension A while keeping the cross sectional area and cross sectional dimensions at the minimum values necessary to resist pressure and maintain stability minimizes thermal conduction through the spacer. This cannot be achieved with a solid disk spacer. The best R-value that can currently be attained using metal disk spacers separated by two inches is R-10 (hr ° F. ft$^2$)/Btu. If the thickness of a disk spacer is doubled then the diameter of the disk must be doubled to maintain stability of the spacer between the glass sheets. But if the diameter is doubled then the area is quadrupled and the net effect of doubling the thickness and quadrupling the area is to double heat conduction through the spacer.

Referring to FIG. 12, cross shaped spacer 312 may have additional members 314 that assist in resisting localized buckling.

A polymer spacer may be outgassed at a temperature greater than ambient temperatures and given a thin coating that may comprise, without limitation, a metal or oxide. A coating may be applied while a spacer is under vacuum and before assembly in a VIG unit. A coating may be a low emissivity coating and or low permeability coating. Coating methods may include, without limitation, vacuum deposition and atomic layer deposition (ALD).

Referring to FIG. 13, glass sheets 320 and 321 are separated by cross shaped spacers, of which 322 and 323 are representative. As a result of atmospheric pressure, glass sheets 320 and 321 will flex 324 and 325 as shown between spacers 322 and 323. Furthermore glass sheets 320 and 321 will flex 326, 327, 328, and 329 over spacers 322 and 323. To equalize the pressure over spacers 322 and 323, the ends 331 of spacers 322 and 323 may be formed with a suitable curve that conforms to the flexure shape of the glass when in service.

Figure 14:
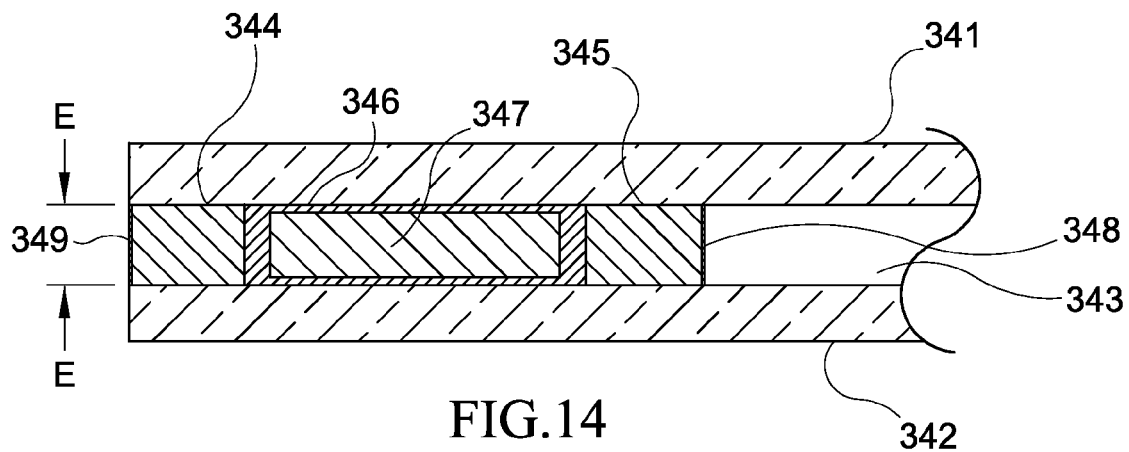
FIG. 14 shows a cross section of an edge seal of a VIG unit with cross shaped spacers and large vacuum gap according to one embodiment of this invention.

FIG. 14 shows a cross section of an edge seal of a VIG unit with cross shaped spacers and large vacuum gap according to one embodiment of this invention. Glass sheets 341 and 342 are separated by a vacuum space 343. The distance between sheets 341 and 342, or gap size, will be at least the size of the spacers such as those disclosed in FIGS. 10 and 11. Therefore the thickness of an edge seal, dimension E, that is in between the glass sheets may be 0.32 inch, which again is very much larger than the typical 0.02 inch gap between the glass sheets of VIG units as disclosed by prior art, and very much larger than the gap size contemplated by the prior art.

Still referring to FIG. 14, elastomeric seals 344 and 345 constrain low permeability fluid or viscous material 346. Imbedded within viscous material 346 is a very low permeability barrier 347 that reduces the cross sectional area of viscous material 346 through which gas can permeate into the vacuum space 343. Barrier 347 may be glass, metal, polymer, or a composite material. Between elastomeric seal 345 and vacuum space 343 there may be a low permeability coating or barrier 348 that may be an oxide coating or metal foil. Barrier 348 further reduces permeation of atmospheric gases into the vacuum space and reduces the amount of outgassing products from seal 345 that enter vacuum space 343. A low permeability coating or layer such as metal foil 349 may be applied to the outside of seal 344 to reduce permeability of air into vacuum space 343.

Figure 15:
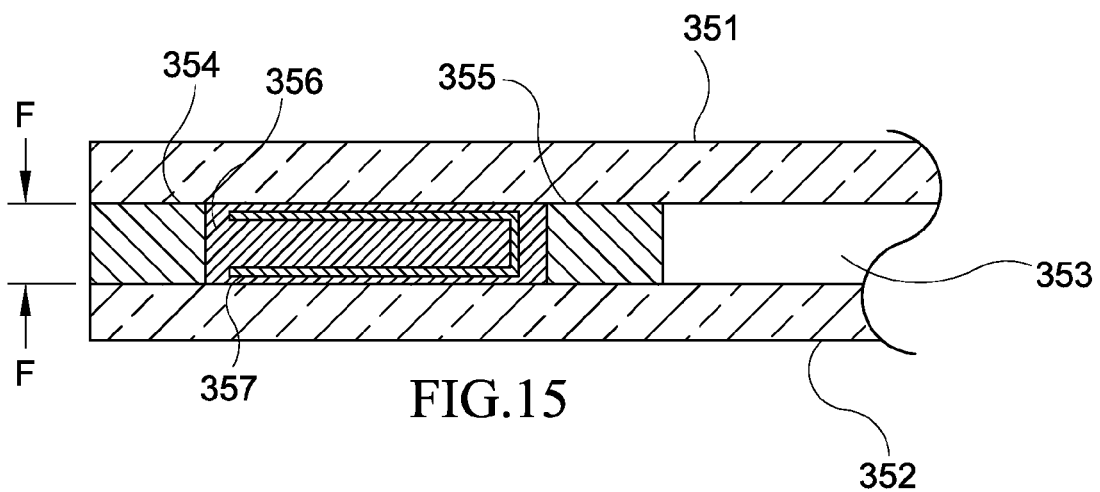
FIG. 15 shows a cross section of an edge seal of a VIG unit with cross shaped spacers and large vacuum gap according to one embodiment of this invention.

FIG. 15 shows a cross section of an edge seal of a VIG unit with cross shaped spacers and large vacuum gap according to one embodiment of this invention. Glass sheets 351 and 352 are separated by a vacuum space 353. The distance between sheets 351 and 352, or gap size, will be at least the size of the spacers such as those disclosed in FIGS. 10 and 11. Therefore the thickness of an edge seal, dimension F, that is in between the glass sheets may be 0.32 inch, which again is very much larger than the typical 0.02 inch gap between the glass sheets of VIG units as disclosed by prior art, and very much larger than the gap size contemplated by the prior art.

Still referring to FIG. 15, elastomeric seals 354 and 355 constrain low permeability fluid or viscous material 356. Imbedded within viscous material 356 is a very low permeability barrier 357 that reduces the cross sectional area of viscous material 356 through which gas can permeate into the vacuum space 353. Barrier 347 may be glass, metal, polymer, or a composite material and may not be, and need not be, a solid shape to accomplish its purpose of reducing the permeable cross sectional area of viscous material 356.

Because the disclosed polymer spacer design results in a very large vacuum gap size, the use of elastomeric seals 354 and 355 is allowed because the percent elongations within the elastomer that will result from differential thermal expansion and contraction of glass sheets 351 and 352 will be well within what suitable elastomers can withstand and will meet structural load and resistance factor design (LRFD) standards for structural glazing. If the vacuum gap was the typical 0.02 inch as disclosed and contemplated by the prior art, the percent elongation would exceed that which suitable elastomers can withstand and the elastomer would fail.

Figure 16:
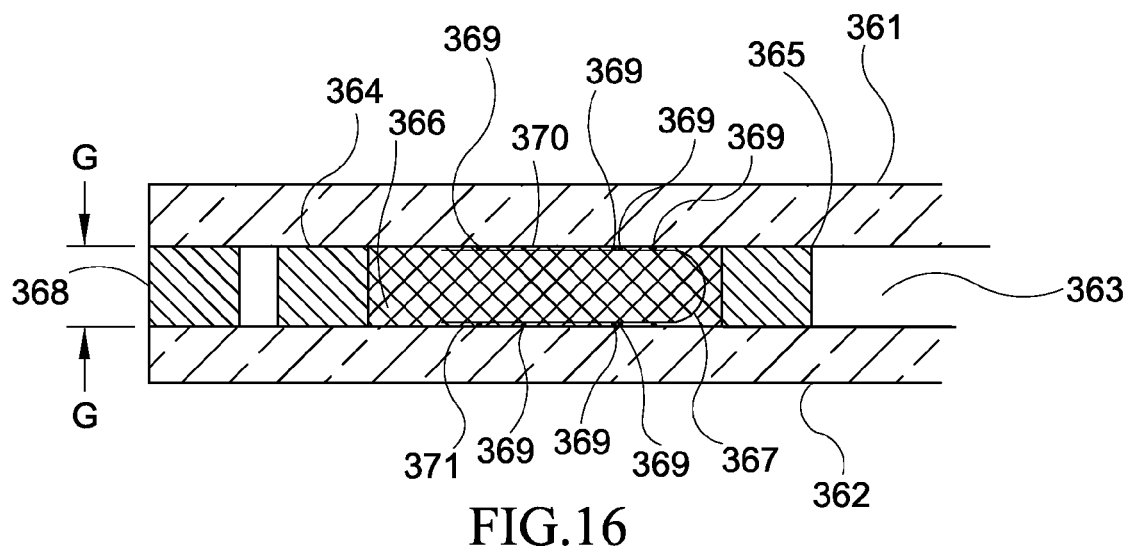
FIG. 16 shows a cross section of an edge seal of a VIG unit with cross shaped spacers and large vacuum gap according to one embodiment of this invention.

FIG. 16 shows a cross section of an edge seal of a VIG unit with cross shaped spacers and large vacuum gap according to one embodiment of this invention. Glass sheets 361 and 362 are separated by a vacuum space 363. The distance between sheets 361 and 362, or gap size, will be at least the size of the spacers such as those disclosed in FIGS. 10 and 11. Therefore the thickness of an edge seal, dimension G, that is in between the glass sheets may be 0.32 inch, which again is very much larger than the typical 0.02 inch gap between the glass sheets of VIG units as disclosed by prior art, and very much larger than the gap size contemplated by the prior art.

Still referring to FIG. 16, elastomeric seals 364 and 365 constrain low permeability fluid or viscous material 366. Imbedded within viscous material 366 is a very low permeability barrier 367 that reduces the cross sectional area of viscous material 366 through which gas can permeate into the vacuum space 363. Barrier 367 may be essentially U-shaped and may comprise a metal. Barrier 367 may comprise stainless steel and the U-shape may flex like a spring. Flexible U-shaped barrier 367 may comprise a polymer with a very thin metal cladding that faces glass sheets 361 and 362. The spring behavior may keep barrier 367 pressed against the inside of glass sheets 361 and 362. There may be small studs 369 on the outside of barrier 367 that get pressed against glass sheets 361 and 362 and maintain a gap 370 between barrier 367 and glass sheet 361 and a gap 371 between barrier 367 and glass sheet 362. The spring action of barrier 367 may not be sufficient to affect dimension G. Spacer 368 may maintain separation of glass sheets 361 and 362 and maintain a fixed dimension G.

Still referring to FIG. 16, elastomeric seals 364 and 365 may adhere to glass sheets 361 and 362 and may be a structural silicone adhesive sealant or other adhesive sealant.

It may be desirable that a polymer spacer for VIG be formed using a two shot or multiple shot injection molding process.

Figure 17:
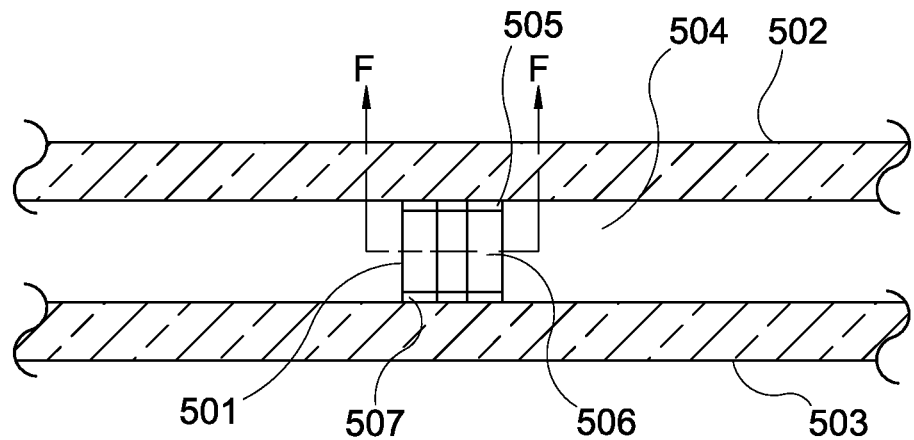
FIG. 17 shows a cross section of a VIG unit with a polymer spacer in between the two glass sheets of a VIG unit according to one embodiment of this invention.

FIG. 17 shows a cross section of a VIG unit with a cross shaped polymer spacer in between the two glass sheets of a VIG unit according to one embodiment of this invention.

Figure 18:
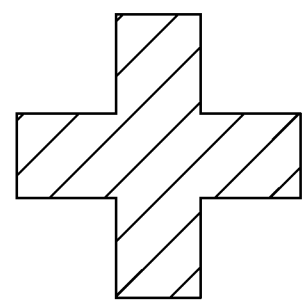
FIG. 18 is a section through the spacer shown in FIG. 17.

FIG. 18 is a section through the spacer shown in FIG. 17.

Referring to FIG. 17, polymer spacer 501 is in between glass sheets 502 and 503 of a VIG unit. Spacer 501 contributes to the maintenance of vacuum space 504 between glass sheets 502 and 503 by resisting the compressive load of atmospheric pressure. Spacer 501 may comprise two or more regions that may comprise different polymers or polymer formulations that may include fillers. As an example only, and without limiting the scope of the invention, spacer 501 may have two distinct regions 505 and 506 within its volume each with a polymer or fillers that are different from the other region. Region 506 may be the polymer polyetherimide whereas region 505 may be polyetherimide with a filler comprising molybdenum disulfide powder. Spacer 501 may be adhered to glass sheet 503 with an adhesive that may comprise epoxy or acrylic. Region 505 of spacer 501 may be in contact with glass sheet 501. Because of the inclusion of molybdenum disulfide in region 505 the coefficient of friction of region 505 will be lower than region 506. The lower coefficient of friction for region 505 reduces the frictional forces between region 505 and glass sheet 502. Inclusion of molybdenum disulfide increases the thermal conductivity of polyetherimide. By having two regions, the bulk of the spacer may have lower thermal conductivity than the lower coefficient of friction region proximate to and in contact with glass sheet 502.

Still referring to FIG. 17, spacer 501 and its two regions 505 and 506 may be formed in a two shot injection molding operation where one shot contains polyetherimide and the other contains polyetherimide with a molybdenum disulfide filler. In general a polymer spacer may be formed in a two shot or multiple shot injection molding operation to produce a spacer comprising regions of different composition. The different compositions may be chosen for any number of reasons to enhance the performance of the spacer with coefficient of friction representing just one such characteristic. By way of example only, and without limiting the scope of this invention, other characteristics may include wear resistance, compression resistance, resistance to UV radiation, emissivity, color, reflectivity, transparency, tensile strength, compression strength, bonding strength, outgassing characteristics, solubility of water, and elastic modulus.

Still referring to FIG. 17, region 507 may be a metal or other non-polymer material that is molded into spacer 501 as part of the molding operation. This material may be chosen based on its ability to be bonded to glass.

Figure 19:
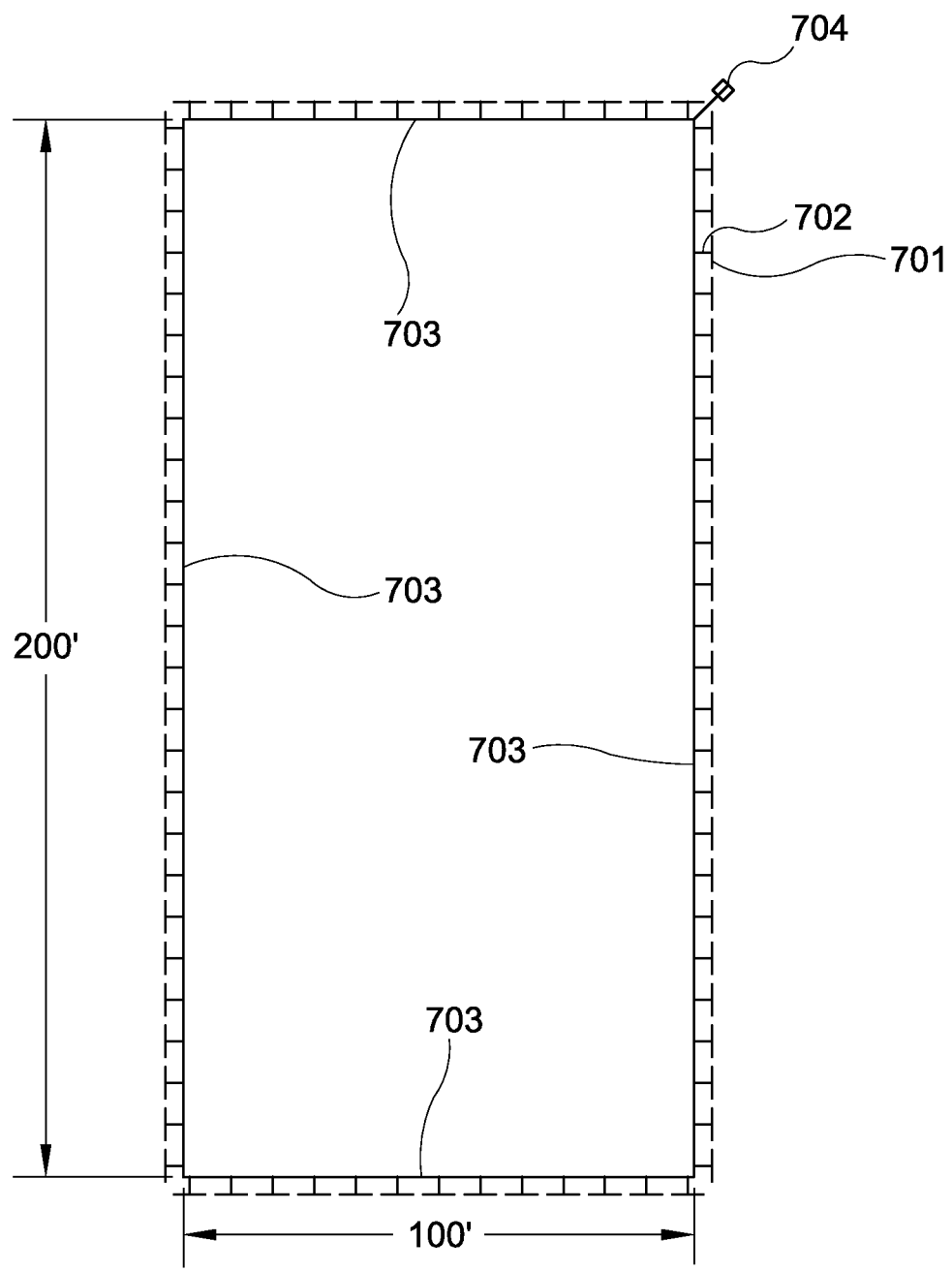
FIG. 19 depicts a schematic layout of a vacuum system according to one embodiment of this invention.

FIG. 19 depicts a schematic layout of a particular embodiment of this invention. Seventy-four VIG units 701 (typical) that are each eight feet wide and 12 feet high enclose one floor of a building with rectangular dimensions of 100 feet by 200 feet. Each VIG unit 701 is connected by a tubing stub 702 (typical) to a tubing system 703 that is connected to a turbomolecular pumping station 704 comprising one turbomolecular pump with a pumping speed of 33 liters/second and a backing pump. The size of pumping station 704 may be approximately a one foot cube. The internal diameter of the port connecting each VIG vacuum space to a stub 702 is one inch. The piping system 703 comprises four inch internal diameter 6061-T6 aluminum tubing with a ⅛ inch wall thickness and a thin internal oxide layer. Sections of tubing are connected in a manner according to FIG. 9 with fluid joints and seals. The edge seals of the VIG units are as shown in FIG. 16 with a U-shaped plastic element clad with 0.001 inch thick stainless steel on the surfaces of the plastic elements facing the glass sheets. The U-shaped plastic element clad in stainless steel is embedded in polyisobutene with a number average molecular weight of 1100 gram/mole. The U-shaped plastic elements maintain two 0.0015 inch gaps between the stainless steel cladding and the glass sheets. Each of these 0.0015 inch gaps filled with polyisobutene is two inches long. The distance between the glass sheets or gap size of the VIG units 701 is 0.32 inch. The spacers are the polymer polyimide with a thermal conductivity of 0.13 W/mK (Watts/meter·degree Kelvin). They are cross shaped as shown in FIG. 11 with a cross sectional area of 0.028 inch. The spacers are distributed between the glass sheets of the VIG units 701 in a square two inch by two inch array.

To quantitatively analyze the vacuum system in FIG. 19 it will be assumed that the system is at a state of equilibrium such that the total gas load entering the system is equal to the gas load removed by the pumping station. Furthermore the gas load from the tubing system and valve leak rates and outgassing is taken as negligible compared to the gas load evolved in the VIG vacuum spaces and is therefore ignored. Furthermore it is assumed that all of the seventy-four VIG units 701 (typical) connect through their own stub 702 (typical) to the piping system 703 at the furthest distance in the system from pumping station 704. This is depicted schematically in FIG. 20, which for clarity shows only one of the seventy-four VIG units 701 and its stub 702 that connect to tubing system 703 at the shown furthest location from the pumping station. The arrangement of FIG. 20 is more stringent than that of FIG. 19 such that the achievable vacuum space pressures of the VIG units in FIG. 19 will be lower than the pressures of the VIG units of FIG. 20, so that if service pressures can be achieved for the system of FIG. 20 then they can be achieved for the system of FIG. 19.

The basic formula used for the analysis is (gas load)=C$[P_1-P_2]$. Gas load is given in (Torr·liter/second). C is molecular conductance and has the units of (liter/second). Pressure is given as P in units of Torr. For a section of tubing, or other vacuum enclosure such as the vacuum space of a VIG unit, the gas load that will be conducted through that tubing is equal to the conductance C of that section of tubing multiplied by the difference between the high pressure P1 at one end of the tubing and the low pressure P2 at the other end.

Figure 20:
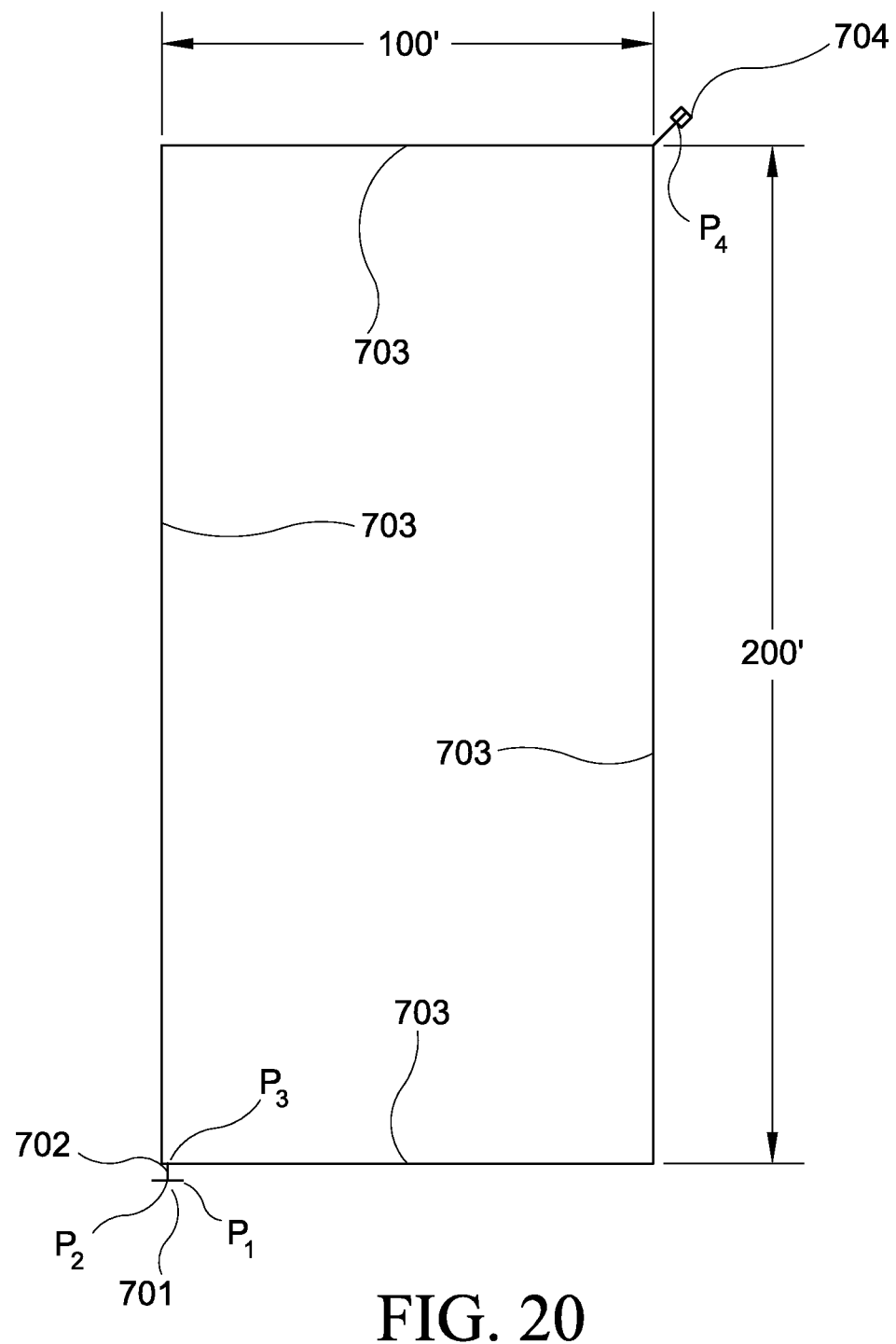
FIG. 20 depicts a schematic layout of a vacuum system suitable for the analysis of the vacuum system of FIG. 19.

Using the basic formula gives (gas load$_{VIG}$)=C$_{VIG}[P_1-P_2]$ where (gas load$_{VIG}$) is the rate at which gas enters a VIG vacuum space, C$_{VIG}$ is the effective molecular conductance of the VIG unit vacuum space, $P_1$ is the highest pressure inside the vacuum space, and $P_2$ is the pressure at a port 44 in FIG. 4 in the VIG vacuum space that connects to a stub 702 in FIG. 20.

Because the system is at equilibrium, the gas load entering a stub 702 will be equal to (gas load$_{VIG}$), which is equal to C$_{VIG}[P_1-P_2]$, and which must equal the gas load conducted by a stub 702, which is C$_{stub}(P_2-P_3)$, where C$_{stub}$ is the molecular conductance of the stub, $P_2$ is the pressure at port 44 in FIG. 4 in the glass sheet that connects to stub 702 in FIG. 20, and $P_3$ is the pressure at the end of a stub that connects to tubing system 703 in FIG. 20.

If the number of VIG units is n, the total gas load will be n[Gas load$_{VIG}$]=nC$_{VIG}[P_1-P_2]$=nC$_{stub}(P_2-P_3)$. Because the system is at equilibrium, the total gas load entering the tubing system 703 in FIG. 20 will be n[gas load$_w$]=nC$_{VIG}[P_1-P_2]$ =nC$_{stub}(P_2-P_3)$, which must equal the gas conducted by tubing system 703 in FIG. 20, which is C$_{tubing}(P_3-P_4)$, where C$_{tubing}$ is the molecular conductance of tubing system 703, $P_3$ is the pressure at the connection of all the stubs 702 in FIG. 20 to tubing system 703, and $P_4$ is the pressure at the inlet to the turbomolecular pumping station 704 in FIG. 20. The gas conducted by the tubing system 703 must be equal to the gas load removed by the pumping station minus the gas load at the pump resulting from gas backflow through the pump known as integral leak rate given in units of (Torr·liter/second). The gas load removed by the pump is given as $P_4$(pumping speed of pump) and has units of (Torr·liter/second).

Stringing all these relationships together gives: $n[\text{gas load}_{VIG}]=nC_{VIG}[P_1-P_2]=nC_{stub}(P_2-P_3)=C_{tubing}(P_3-P_4)=P_4$ (pumping speed of pump)–(integral leak rate). This results in a system of four linear equations which can be represented in matrix form as:

$$\begin{bmatrix} nC_{VIG} & -nC_{VIG} & 0 & 0 \\ -nC_{VIG} & nC_{VIG}+nC_{stub} & -nC_{stub} & 0 \\ 0 & -nC_{stub} & nC_{stub}+C_{tubing} & -C_{tubing} \\ 0 & 0 & -C_{tubing} & C_{tubing}+\text{pumping speed} \end{bmatrix}$$

$$\begin{bmatrix} P_1 \\ P_2 \\ P_3 \\ P_4 \end{bmatrix} = \begin{bmatrix} n(\text{gas load}_{VIG}) \\ 0 \\ 0 \\ \text{integral leak rate} \end{bmatrix}$$

Given the system of equations above and knowing (gas load$_{VIG}$), $C_{VIG}$, $C_{stub}$, $C_{tubing}$, pumping speed, and integral leak rate allows the determination of $P_1$, $P_2$, $P_3$, and $P_4$, where $P_1$ is the highest pressure in a VIG vacuum space.

Based on empirically determined outgassing rates at ambient temperatures, empirically determined decreasing outgassing rates with time at ambient temperatures, permeabilities for the materials specified, and conductances for the piping and vacuum spaces for the described vacuum system depicted in FIG. 20, after outgassing for five to nine months with a turbomolecular pumping station running continuously at a pumping speed of 33 liters/second and at a temperature of 23 degrees Celsius, the pressure $P_1$ in a VIG unit vacuum space within the system shown in FIG. 20 is estimated to reach 9E-5 Torr, which at a vacuum gap size of 0.32 inch is service pressure.

To demonstrate the insensitivity of the system of FIG. 20 to pumping speed, if the system is allowed to outgas for five to nine months with the turbomolecular pumping station 704 running continuously at a pumping speed of 33 liters/second at 23 degrees Celsius and the pump is then run continuously at a reduced pumping speed of 3 liters/second, it is estimated that at 23 degrees Celsius the vacuum space of a VIG unit can be maintained at a pressure $P_1$ of 1.6E-4 Torr, which could be considered service pressure at a vacuum space gap size of 0.32 inch.

If there was one building floor above and below that shown in FIG. 20 with identical VIG vacuum systems and with tubing from those systems connected directly to the pumping station of FIG. 20, then at 23 degrees Celsius the VIG units on all three floors could be maintained at a pressure $P_1$ of 3E-4 Torr with a turbomolecular pumping station 704 running continuously at 3 liters/second.

It may be necessary to run a pumping station continuously at full speed, say 33 liters/second, to outgas a VIG vacuum system in the least amount of time, but after that the speed may be reduced to say 3 liters/second while still running continuously to reduce pumping station power consumption, which at 3 liters/second may end being less than 150 Watts.

Figure 21:
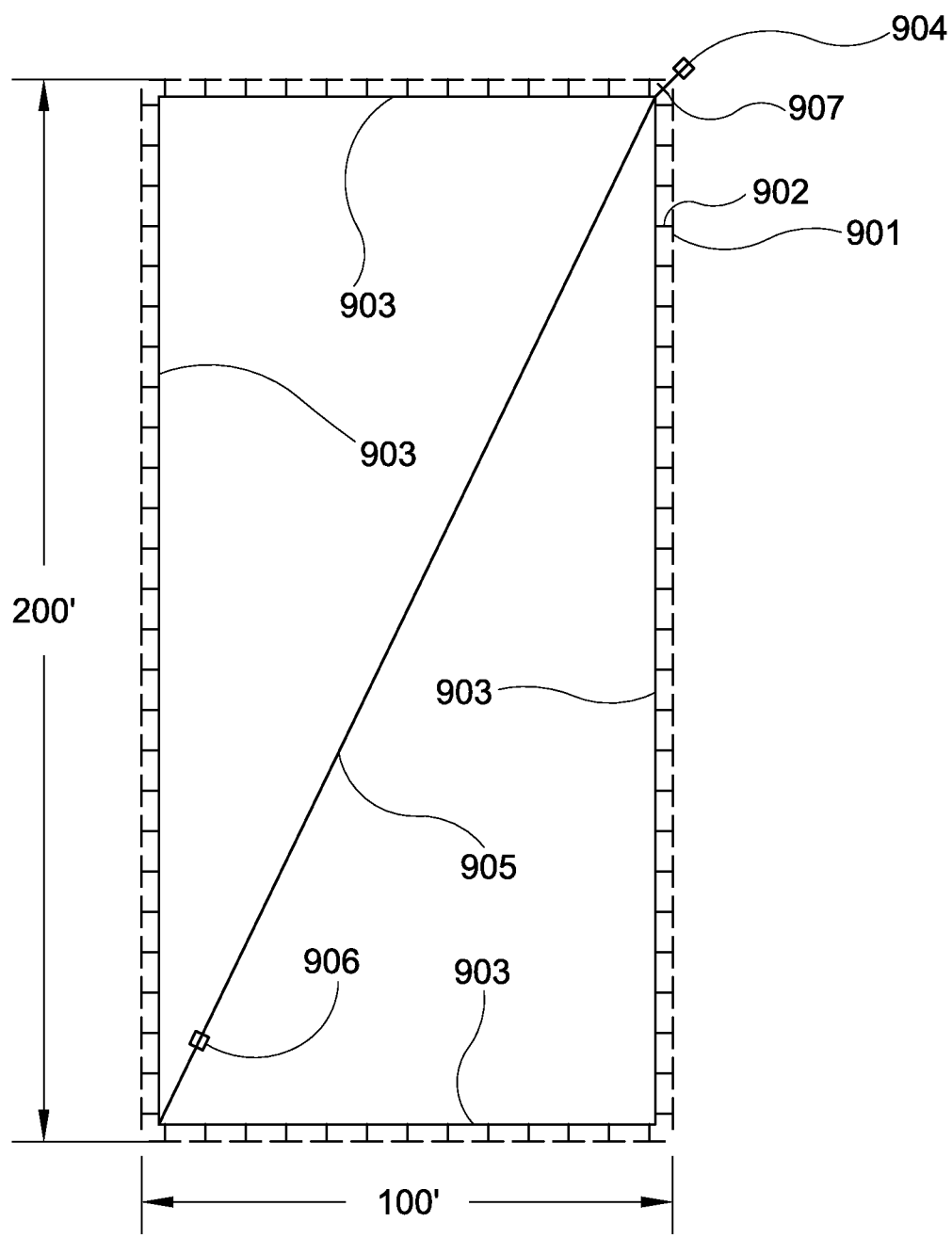
FIG. 21 shows a revised schematic of FIG. 19 with an additional tubing run and turbomolecular pump according to one embodiment of this invention.

FIG. 21 shows a revised schematic of FIG. 19 with an additional tubing run and turbomolecular pump according to one embodiment of this invention. FIG. 21 depicts Seventy-four VIG units 901 (typical) that are each eight feet wide and 12 feet high that enclose one floor of a building with rectangular dimensions of 100 feet by 200 feet. Each VIG unit 901 is connected by a tubing stub 902 (typical) to a tubing system 903 that is connected to a turbomolecular pumping station 904 comprising one turbomolecular pump with a pumping speed of 33 liters/second and one backing pump. There is an additional tubing run 905 with a turbomolecular pump 906 in line as shown. Turbomolecular pump 906 does not need a backing pump or gate valve. Gate valve 907 is sufficient to isolate the vacuum system from the atmosphere because the system is open to the atmosphere only through pumping station 904.

For a VIG unit as specified for FIGS. 19 and 20, the whole window thermal transfer coefficient would be $U_w=0.2$ W/(m$^2$K) (0.2 Watt/meter$^2$·degree Kelvin) or $U_w=0.035$ Btu/(hr ° F. ft$^2$) (0.035 British thermal Units/hour·degree Fahrenheit·foot$^2$) or R-28 (hr ° F. ft$^2$)/Btu.

At best, triple pane inert gas filled windows with low emissivity coatings on all four internal surfaces can attain $U_w=0.6$ W/m$^2$K or R-10 (hr ° F. ft$^2$)/Btu. A whole window thermal transfer coefficient of $U_w=0.6$ W/m$^2$K or R-10 (hr ° F. ft$^2$)/Btu is also the best that two pane VIG units with metal spacers can achieve.

R-28 (hr ° F. ft$^2$)/Btu exceeds the U.S. Department of Energy's recommended wall insulating R-value for new residential frame construction in Alaska, which is R-26 (hr ° F. ft$^2$)/Btu.

The permeability of the PIB within the edge seals specified for FIGS. 19 and 20 will vary with its temperature. Its permeability will increase with increasing temperature. During cold seasons less gas will permeate through the edge seal than during warm seasons. In addition, the outgassing rates of the glass and spacers will increase with increasing temperatures. Therefore during colder seasons the pressure within the VIG vacuum spaces may be lower than during warmer seasons. There may be times when the pressure in a VIG vacuum space exceeds what would be considered a service pressure. These instances are more likely to occur during warm seasons when high insulating values of the VIG units are not as critical as during cold weather. Sun exposure will cause the VIG units to heat up, which may push a vacuum space pressure to temporarily exceed service pressures. So there may be seasonal as well as daily pressure fluctuations and some of those fluctuations in some of the windows may exceed service pressures. These fluctuations may result in higher pressures for newer VIG units with decreasing pressures over time as the VIG units continue to slowly outgas over what may be periods of years. A vacuum system comprising VIG units may still fulfill a specified design requirement for building energy efficiency even if pumping only maintains service pressures in most of the VIG units for a period of indefinite duration or for an indefinite number of periods of indefinite duration. The extent to which pressure fluctuations that exceed service pressures can be tolerated may depend on many factors that may include without limitation climate, physical sun exposure patterns, temporal sun exposure patterns, building orientation, shading from adjacent buildings, cost benefit analyses, other energy efficiency measures, and building generated renewable energy to offset building energy use.

REFERENCES CITED: OTHER PUBLICATIONS

Fang Y, Hyde T, Eames P C, Hewitt N. 2009. Theoretical and experimental analysis of the vacuum pressure in a vacuum glazing after extreme thermal cycling. Solar Energy 83(9): 1723-1730

Jensen K I, Schultz J M, Kristiansen F H. 2004. Development of windows based on highly insulating aerogel glazings. Journal of Non-Crystalline Solids 350:351-357

Jousten K, editor. 2008. Handbook of vacuum technology. Weinheim, Germany: Wiley-VCH; 1002 p.

Jousten K, Author. Thermal outgassing. CAS-CERN Accelerator School:Vacuum Technology; 1999 May 28-Jun. 3; Snekersten, Denmark. pp. 111-125

Koebel M M, Manz H, Mayerhofer K E, Keller B. 2010. Service life limitations in vacuum glazing: a transient pressure balance model. Solar Energy Materials and Solar Cells 94(6):1015-1024

Lenzen M, Turner G M, Collins R E. 1999. Thermal outgassing of vacuum glazing. Journal of Vacuum Science & Technology A 17(3):1002-1017

Ng N, Collins R E. 2000. Evacuation and outgassing of vacuum glazing. Journal of Vacuum Science & Technology A 18(5):2549-2562

O'Hanlon J. F. 2003. A user's guide to vacuum technology, $3^{rd}$ Ed. Hoboken, N.J.: John Wiley & Sons. 516 p.

Roth A. 1994. Vacuum sealing techniques. Woodbury, N.Y.: American Institute of Physics. 845 p.

Van Den Bergh S, Hart R, Petter Jelle B, Gustaysen A. 2013. Window spacers and edge seals in insulating glass units: a state-of-the-art review and future perspectives. Energy and Buildings 58 (2013):263-280

What is claimed is:

1. A vacuum system comprising:
   multiple vacuum insulated glass units, each unit comprising a first glass sheet and a second glass sheet with a vacuum space in between, wherein each vacuum space is connected to one or more other vacuum spaces via one or more conduits; and
   at least one vacuum pump in communication with the vacuum spaces and configured to maintain a vacuum in all or most of the vacuum spaces indefinitely when the vacuum insulated glass units are in service in a building structure; wherein the vacuum to be maintained is defined by the mean free path of an air molecule in the vacuum being greater than the distance between the first and second glass sheets or the distance between obstructions within a vacuum space as measured perpendicular to the glass sheets.

2. The vacuum system of claim 1 comprising multiple vacuum pumps in communication with the vacuum spaces, wherein each of the vacuum pumps is configured to run continuously while the vacuum insulated glass units are in service in the building structure.

3. The vacuum system of claim 1, wherein at least one of the vacuum insulated glass units has an edge seal that comprises a polymer.

4. The vacuum system of claim 1, wherein at least one of the vacuum insulated glass units has at least one spacer that comprises at least one polymer.

5. The vacuum system of claim 4, wherein the polymer spacer is cross shaped.

6. The vacuum system of claim 4, wherein the polymer spacer comprises a metal.

7. The vacuum system of claim 4, wherein the distance between the glass sheets of the vacuum insulated glass units is greater than 0.10 inch.

8. The vacuum system of claim 4, wherein the distance between the glass sheets of the vacuum insulated glass units is greater than 0.15 inch.

9. The vacuum system of claim 4, wherein the distance between the glass sheets of the vacuum insulated glass units is greater than 0.20 inch.

10. The vacuum system of claim 4, wherein the distance between the glass sheets of the vacuum insulated glass units is greater than 0.25 inch.

11. The vacuum system of claim 4, wherein the distance between the glass sheets of the vacuum insulated glass units is greater than 0.30 inch.

12. The vacuum system of claim 1, wherein the at least one vacuum pump is a turbomolecular vacuum pump.

13. The vacuum system of claim 1, wherein the at least one vacuum pump runs continuously until there is a system failure, an anticipated system failure, an event that could precipitate a system failure, or an anticipated event that could precipitate a system failure.

14. A vacuum system comprising:
   multiple vacuum insulated glass units, each unit comprising a first glass sheet and a second glass sheet with a vacuum space in between at a pressure less than atmospheric pressure, wherein each vacuum space is connected to one or more other vacuum spaces via one or more conduits;
   at least one vacuum pump in communication with the vacuum spaces and configured to maintain the pressure at less than atmospheric pressure in the vacuum spaces when the vacuum insulated glass units are in service in a building structure; and
   at least one vacuum valve that is configured to be forced closed directly by the effect of a pressure difference, wherein the valve comprises:
   a port;
   a material or materials having a backside and a face opposite to the backside,
   wherein the material or materials are configured to pivot in response to air rushing into the vacuum system as the result of a breach to the atmosphere in a vacuum insulated glass unit, such that pressure created by air, acting on the backside of the material or materials, forces the value from an open position, in which the material or materials do not cover the port, into a closed position, by causing the material or materials to pivot so that the face opposite to the backside of the material or materials seats and seals around the port, thereby closing the vacuum valve.

15. The vacuum system of claim 14, wherein the closed valve is configured to isolate the vacuum space of a vacuum insulated glass unit from the vacuum spaces of other vacuum insulated glass units.

16. The vacuum system of claim 14, wherein the vacuum insulated glass units have an edge seal that comprises a polymer and at least one spacer that comprises at least one polymer, and further wherein the distance between the glass sheets of the vacuum insulated glass units is greater than 0.10 inch.

17. The vacuum system of claim 14, wherein the vacuum valve further comprises a pivot pin set in a notch and the material or materials are configured to pivot about the pin in response to air rushing into the vacuum system as the result of a breach to the atmosphere in a vacuum insulated glass unit.

18. The vacuum system of claim 14, wherein the material or materials comprise a tab extending outward from the face opposite the backside.

19. The vacuum system of claim 14, wherein the vacuum valve further comprises a knife edge annular ring surrounding the port against which the face of the material or materials seats and seals.

20. The vacuum system of claim 19, wherein the face of the material or materials opposite the backside has an elastomeric coating into which said knife edge annular ring seats and seals.

21. A method for maintaining a vacuum system, the vacuum system comprising multiple vacuum insulated glass units, each unit comprising a first glass sheet and a second glass sheet, wherein each vacuum space is connected to one or more other vacuum spaces via one or more conduits; and at least one vacuum pump in communication with the vacuum spaces, the method comprising:

maintaining a vacuum in all or most of the vacuum spaces indefinitely when the vacuum insulated glass units are in service in a building structure by running the at least one vacuum pump; wherein the vacuum being maintained is defined by the mean free path of a gas molecule in the vacuum being greater than the distance between the first and second glass sheets or the distance between obstructions within a vacuum space as measured perpendicular to the glass sheets.

22. The method of claim 21, wherein the at least one vacuum pump is run continuously for a period of at least six months.

23. The method of claim 21, wherein the at least one vacuum pump runs continuously through daily and seasonal temperature fluctuations for a period of at least one year while the vacuum insulated glass units are in service in a building structure.

24. The method of claim 23, wherein the at least one vacuum pump runs continuously until there is a system failure, an anticipated system failure, an event that could precipitate a system failure, or an anticipated event that could precipitate a system failure.

* * * * *